United States Patent
Itani

(10) Patent No.: US 12,079,568 B2
(45) Date of Patent: *Sep. 3, 2024

(54) DOMAIN-SPECIFIC LANGUAGE INTERPRETER AND INTERACTIVE VISUAL INTERFACE FOR RAPID SCREENING

(71) Applicant: Quixotic Labs Inc., Seattle, WA (US)

(72) Inventor: Sara Itani, Seattle, WA (US)

(73) Assignee: Quixotic Labs Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/391,520

(22) Filed: Dec. 20, 2023

(65) Prior Publication Data

US 2024/0119225 A1 Apr. 11, 2024

Related U.S. Application Data

(63) Continuation of application No. 17/738,980, filed on May 6, 2022, now Pat. No. 11,893,341, which is a
(Continued)

(51) Int. Cl.
*G06F 16/248* (2019.01)
*G06F 3/0482* (2013.01)
(Continued)

(52) U.S. Cl.
CPC .......... *G06F 40/177* (2020.01); *G06F 3/0482* (2013.01); *G06F 16/248* (2019.01);
(Continued)

(58) Field of Classification Search
CPC .... G06F 40/177; G06F 3/0482; G06F 16/248; G06F 16/335; G06F 16/38; G06F 40/205;
(Continued)

(56) References Cited

U.S. PATENT DOCUMENTS 6,742,015 B1 5/2004 Bowman-Amuah
7,685,083 B2 3/2010 Fairweather
(Continued)

FOREIGN PATENT DOCUMENTS

JP 2000330622 A 11/2000
JP 2002259463 A 9/2002
(Continued)

OTHER PUBLICATIONS

International Search Report Mailed Aug. 5, 2021 for PCT/IB2021/054548 Filed May 25, 2021, 4 pages.
(Continued)

*Primary Examiner* — Sanchita Roy
(74) *Attorney, Agent, or Firm* — AEON Law, PLLC; Adam L. K. Philipp; James Namiki

(57) ABSTRACT

A domain-specific language interpreter and live updating visual interface for rapid interactive exploration, filtering, and analysis of a dynamic data set. It includes a multi-line editor that allows a user to enter and edit input on any line at any time, and a grid view display. As the user enters an expression in the multi-line editor, it continually parses and executes the expression with respect to the domain-specific language, recognizing data tags and operations. Each data tag is associated with values for identifiers of the data set, and each operation can be applied to the values. The grid view display updates with a live display of identifiers and result values for the input expression according to the current contents of the multi-line editor user input interface.

30 Claims, 31 Drawing Sheets

Related U.S. Application Data continuation of application No. 17/374,877, filed on Jul. 13, 2021, now Pat. No. 11,328,119, which is a continuation of application No. PCT/IB2021/054548, filed on May 25, 2021.

(60) Provisional application No. 63/029,556, filed on May 24, 2020.

(51) Int. Cl.
| | | |
|---|---|---|
| *G06F 16/335* | (2019.01) | |
| *G06F 16/38* | (2019.01) | |
| *G06F 40/177* | (2020.01) | |
| *G06F 40/205* | (2020.01) | |
| *G06F 40/30* | (2020.01) | |

(52) U.S. Cl.
CPC ............ *G06F 16/335* (2019.01); *G06F 16/38* (2019.01); *G06F 40/205* (2020.01); *G06F 40/30* (2020.01)

(58) Field of Classification Search
CPC .... G06F 40/30; G06F 3/0481; G06F 16/2428; G06F 40/103; G06F 40/166; G06F 40/221
See application file for complete search history.

(56) References Cited

U.S. PATENT DOCUMENTS

| | | |
|---|---|---|
| 2007/0266017 A1 | 11/2007 | Held et al. |
| 2011/0072340 A1 | 3/2011 | Miller et al. |
| 2012/0079363 A1 | 3/2012 | Folting et al. |
| 2014/0189548 A1 | 7/2014 | Werner |
| 2014/0279865 A1 | 9/2014 | Kumar et al. |
| 2016/0132300 A1 | 5/2016 | Bernelas et al. |
| 2019/0012736 A1 | 1/2019 | Courbage et al. |

FOREIGN PATENT DOCUMENTS

| | | |
|---|---|---|
| JP | 2004046657 A | 2/2004 |
| JP | 2014229297 B | 5/2015 |
| JP | 2016057802 A | 4/2016 |
| KR | 20170102884 A | 9/2017 |

OTHER PUBLICATIONS

Written Opinion mailed Aug. 5, 2021 for PCT/IB2021/054548 Filed May 25, 2021, 5 pages.

Demystifying Power BI Q&A—Parts 1-3, Microsoft Power BI Blog, 2014, 18 pages.

Extended European Search Report received for EP Patent Application No. 21812528.4, mailed on Jun. 17, 2024, 8 pages.

500

1 $UnitedStatesLargeCap
2 returonequit|

- ReturnOnEquityPct: Return On Equity %
- ReturnOnEquityPctTtm: Return On Equity %...
- ReturnOnCommonEquity: Return On Common E...
- ReturnOnCommonEquityTtm: Return On Commo...
- ReturnOnAverageEquity: Return On Average...
- ReturnOnAverageEquityTtm: Return On Aver...
- TotalRestaurantsAcquired: Total Restaura...
- TotalRestaurantsAcquiredTtm: Total Resta...

Drag here to set row groups

| Ticker |
|---|
| ADBE |
| ADI |
| ADM |
| ADP |
| ADSK |

ReturnOnEquityPct: Return On Equity %

This is a measure of the return on money provided by the firms owners. This ratio represents earnings from continuing operations less preferred dividend divided by common equity and is expressed in percentage.

Formula=[(ECOIN-PSDIS)/TAPC]*100

ECOIN=Earnings From Continuing Operations
PSDIS=Preferred Dividend and Other Adjustments
TAPC=Total Shareholders Equity

*Fig. 5A*

Data Explorer — 551, 550

Company Name — 555
Microsoft Corporation

Search Text — 560
EBIT

Data Package — 565
S&P Global - Fundamental Data

Available Data Items (41 results)

| Data Item Name | Description | Value (Qtr) | Value (Ttm) |
|---|---|---|---|
| EBIT, 10 Yr. CAGR % — 570 | This ratio shows the compound growth in EBIT over ten years. Formula = ((EBIT (t) / EBIT (t-10))^(1/10 - 1) * 100 Incase of Quarter, the above formula is modified to the following (((EBIT (t) / EBIT (t-40))^(1/10) - 1) * 100 Where EBIT = Earnings Before Interest And Tax | 8.163900 — 571 | 8.566600 — 572 |
| EBIT, 1 Yr. Growth % | This ratio shows the simple growth in Earnings Before Interest And Tax over one year. Formula = (EBIT (t) / EBIT (t-1) - 1) * 100 Incase of Quarter, the above formula is modified to the following (EBIT (t) / EBIT (t-4) - 1) * 100 Where EBIT = Earnings Before Interest And Tax. | 28.838800 | 21.961300 |
| EBIT, 2 Yr. CAGR % | This ratio shows the compound growth in EBIT over two years. Formula = ((EBIT (t) / EBIT | 32.086600 | 24.379900 |

1 to 41 of 41  |<  << Page 1 of 1 >> >|

*Double click cells to pin data tags* — 575

Copy pinned tags to clipboard — 580

Fig. 5B

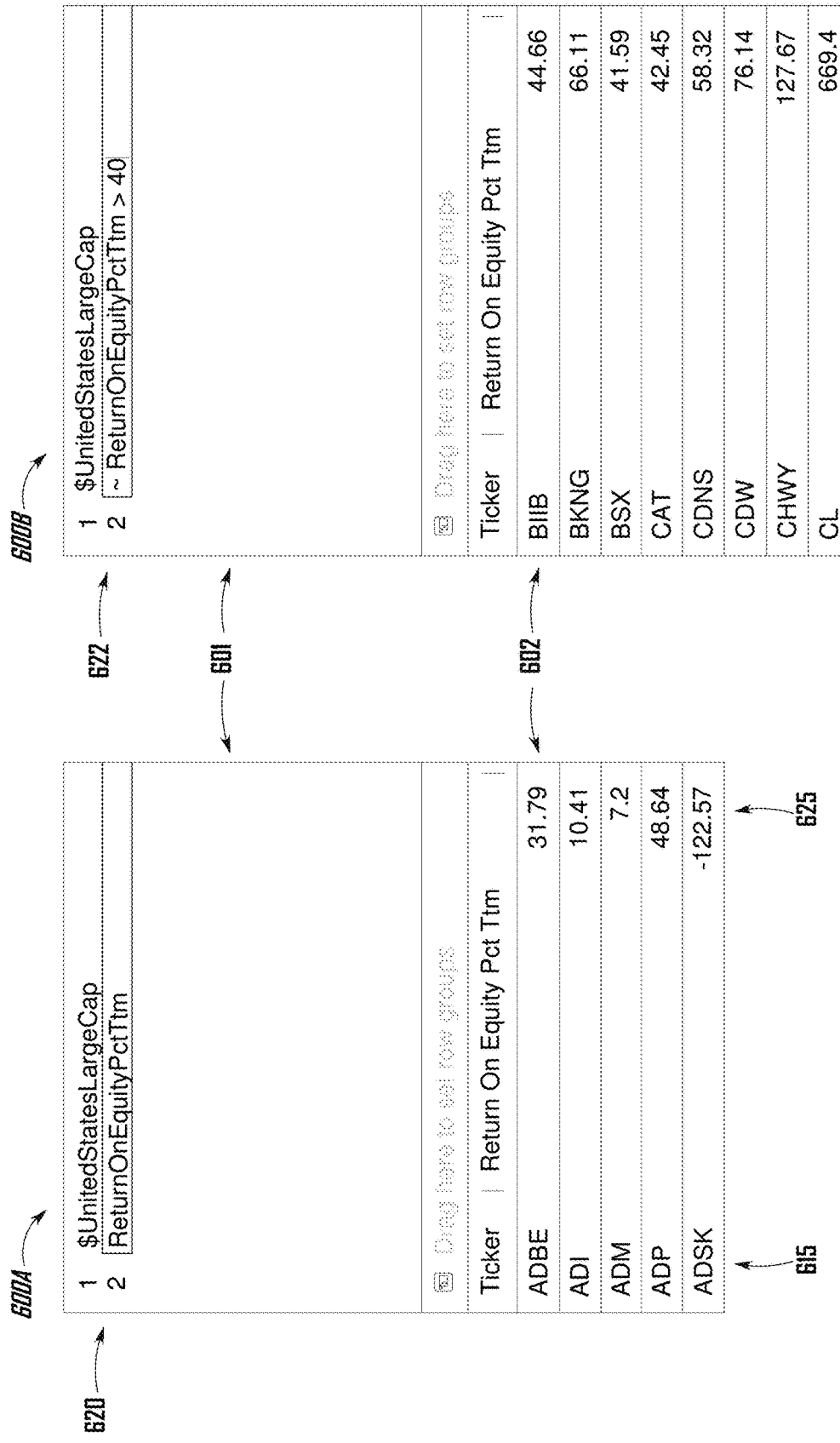

700

740
1  $UnitedStatesLargeCap
2  ~ ReturnOnEquityPctTtm > 40
3  ReturnOnAssets
4  (ReturnOnEquityPct + ReturnOnAssets) => MyCustomIndex
5  GicsSector

701

702

Drag here to set row groups

| Ticker | Return On Equity Pct Ttm | Return On Assets | My Custom Index | Gics Sector |
|---|---|---|---|---|
| BIIB | 44.66 | 15.74 | 57.88 | Health Care |
| BKNG | 66.11 | 13.68 | 92.5 | Consumer Discretionary |
| BSX | 41.59 | 4.37 | 139.97 | Health Care |
| CAT | 42.45 | 4.66 | 34.29 | Industrials |
| CDNS | 58.32 | 10.05 | 157.33 | Information Technology |
| CDW | 76.14 | 9.04 | 87.37 | Information Technology |
| CHWY | 127.67 | -23.55 | 60.58 | Consumer Discretionary |
| CL | 669.4 | 16.17 | 761.52 | Consumer Staples |
| CLX | 125.83 | 11.97 | 145.91 | Consumer Staples |

| | |
|---|---|
| 1 | $UnitedStatesLargeCap |
| 2 | (ReturnOnEquityPct [-3q:0q] ) | TrendStability => RoeStability |
| 3 | |
| 4 | ~ RoeStability > 0.8 |
| 5 | Filings10K |
| 6 | GicsSector |

| Ticker | eval_2-1 | Roe Stability | Filings 10k | Gics Sector |
|---|---|---|---|---|
| A | | 0.9 | A 10K: 2019-12-19 | Health Care |
| AAPL | | 0.81 | AAPL 10K: 2019-10-31 | Information Technology |
| ADBE | | 0.94 | ADBE 10K: 2020-01-21 | Information Technology |
| ADM | | 0.9 | ADM 10K: 2019-10-31 | Consumer Staples |
| AMD | | 0.92 | AMD 10K: 2020-02-04 | Information Technology |
| AMT | | 0.98 | AMT 10K: 2019-10-31 | Real Estate |
| C | | 0.96 | C 10K: 2019-11-01 | Financials |
| CHTR | | 0.84 | CHTR 10K: 2020-01-31 | Communication Services |
| CRWD | | 0.81 | | Information Technology |
| D | | 0.87 | D 10K: 2019-11-01 | Utilities |

*Fig. 12*

```
PERCENTILERANK(((IF(ISNA((ZSCORE($RX072[LF],N,"UNIVBUCKET(\"HCLASS.ICB\",1)
")),0,
(ZSCORE($RX072[LF],N,"UNIVBUCKET(\"HCLASS.ICB\",1)")))+IF(ISNA((ZSCORE($RR
710[LF],N,"UNIVBUCKET(\"HCLASS.ICB\",1)")),0,
(ZSCORE($RR710[LF],N,"UNIVBUCKET(\"HCLASS.ICB\",1)")))+IF(ISNA((ZSCORE(tot
alconsensusgrowth($BE008:Y[revisionDate=M-1]),N,"UNIVBUCKET(\"HCLASS.ICB\",1
)"))),0,
```

*Fig. 16A*
PRIOR ART

| | |
|---|---|
| 1 | roe \| zscore => roe_zscore |
| 2 | roa \| zscore => roa_zscore |
| 3 | roe_zscore + roa_zscore \| quintile_bucket => bucket |
| 4 | ~ bucket == 1 |

*Fig. 16B*

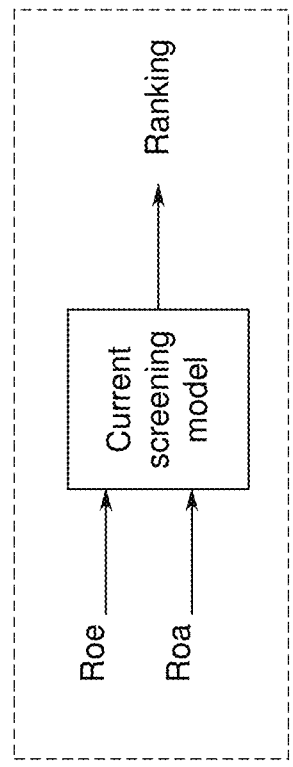
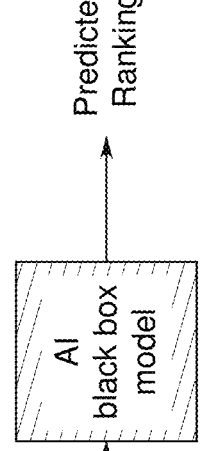
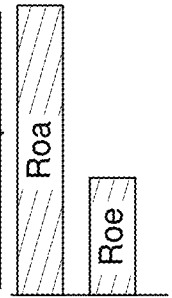
Fig. 19A

Step 1: Training Data and Predictions

1950

| Unique identifier | Corresponding Features | | To predict |
|---|---|---|---|
| (Ticker, Date) | Return On Equity | Return On Assets ... | In subset? |
| MSFT, 12-31-2015 | 53.15 | 13.59 ... | TRUE |
| AAPL, 12-31-2015 | 43.12 | 14.50 ... | TRUE |
| GOOG, 12-31-2015 | 13.59 | 20.59 ... | FALSE |
| ... | ... | ... | ... |

Notes:
- Ranking could also be numeric
- Features can be either user selected, or generated
- Dates in a training set could be all one date, or a combination of dates.

Step1: Train AI / Machine Learning Model

Train a model using your favorite approach (e.g., AutoML, random forest, bootstrapping,...) - preferably one where you can infer relative feature weights.

Output: a predictive module - composed of one or multiple models, if you create an ensemble - that can be applied to a list of tickers and dates. In the case of multiple models, an aggregate "agreement" score can be generated (e.g., count the number of models that find a screen.) Higher scores for a company mean that the company was found in more screens.

Fig. 19B

AI #2: Custom regime change detection

What does it mean?
Early indicator that factors you are depending on have shifted action: think through what may have changed, update the model, or consider prioritizing ideas from elsewhere

AI #4: Feature suggestions

☑ Suggested features to add

| Indicator | Confidence |
|---|---|
| Roe Trend Stability | ☆☆☆☆ |
| Sentiment | ☆☆ |

Suggested features to remove

| Indicator | Confidence |
|---|---|
| Piotroski score | ☆☆☆☆☆ |
| Gross margin | ☆☆☆☆ |

Fig. 22

```
1  $UnitedStatesLargeCap
2
3  ReturnOnAssets | RankHighToLow => RoaRank
4
5  # If ROA is in the top 75, display a ☑, otherwise display ✗
6  ((RoaRank <= 75 ? "☑" : "✗") + " ReturnOnAssets") => RoaIndicator
7
```

| Ticker ↑ | Return On Assets | Roa Rank | Roa Indicator |
|---|---|---|---|
| A | 8.73 | 150.00 | ✗ 8.73 |
| AAL | -8.28 | 599.00 | ✗ -8.2784 |
| AAP | 3.47 | 377.00 | ✗ 3.4748 |
| AAPL | 24.73 | 10.00 | ☑ 24.732 |
| ABBV | 9.21 | 138.00 | ✗ 9.2076 |
| ABC | 3.43 | 380.00 | ✗ 3.4264 |
| ABMD | 13.11 | 75.00 | ☑ 13.1056 |
| ABNB | -80.28 | 624.00 | ✗ -80.2756 |

Fig. 23

| # | /Model/SituationReport |
|---|---|
| 1 | EpsNormalizedConsensusMean |
| 2 | EbitConsensusMean |
| 3 | FreeCashFlowConsensusMean |
| 4 | RevenueConsensusMean |
| 5 | EpsNormalizedStandardDeviation |
| 6 | |
| 7 | |

| Company Name | Eps Normalized Consensus Mean | Ebit Consensus Mean | Free Cash Flow Consensus Mean | Revenue Consensus Mean | Eps Normalized Standard Deviation |
|---|---|---|---|---|---|
| Bed Bath & Beyond Inc. | 54 | 53 | 68 | 47 | 56 |
| Best Buy Co., Inc. | 46 | 50 | 53 | 50 | 56 |
| LVMH Moët Hennessy - Louis... | 51 | 55 | 54 | 53 | 51 |
| MGM Resorts International | 56 | 73 | 62 | 65 | 46 |
| Microsoft Corporation | 86 | 95 | 96 | 99 | 48 |

Fig. 25

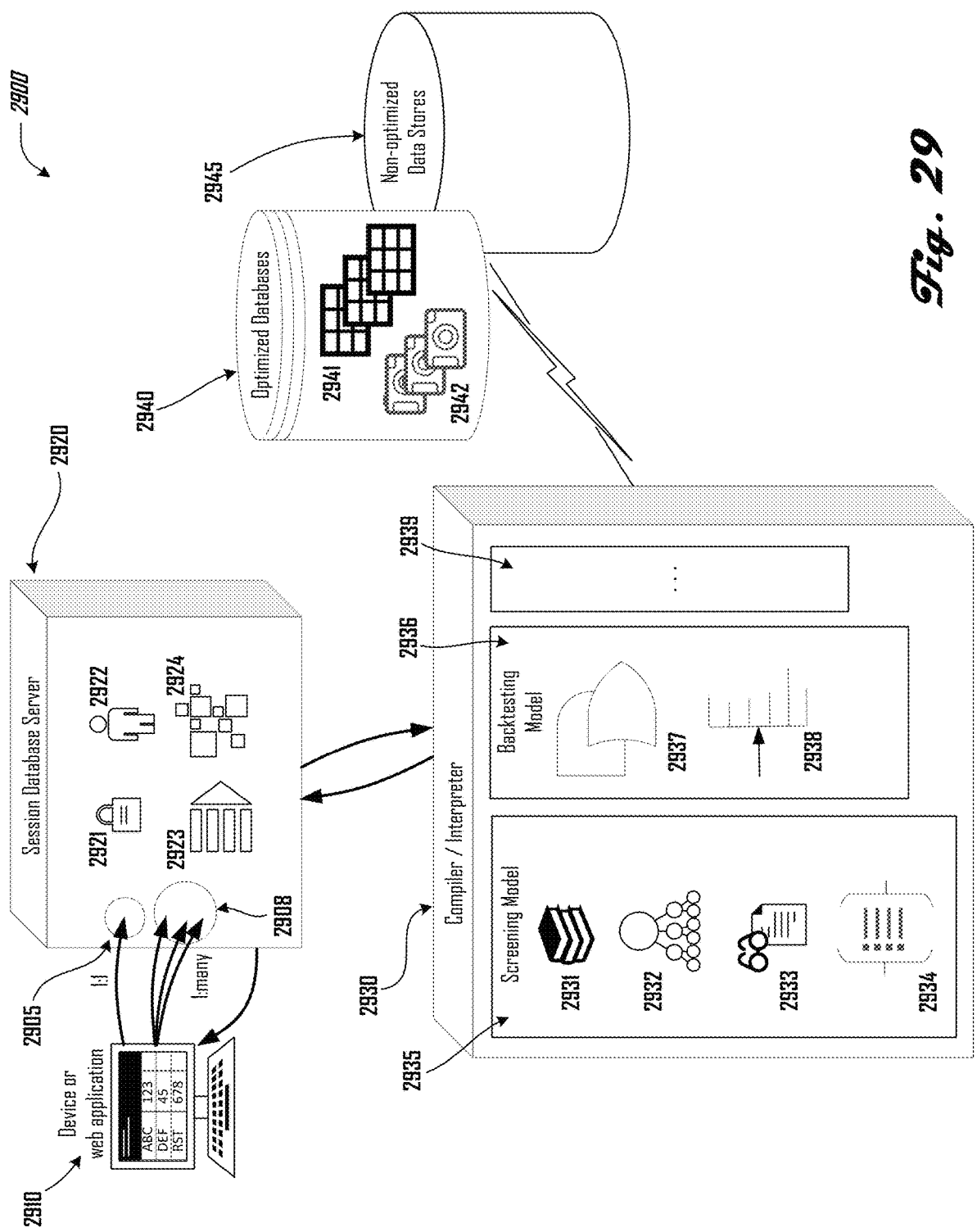

DOMAIN-SPECIFIC LANGUAGE INTERPRETER AND INTERACTIVE VISUAL INTERFACE FOR RAPID SCREENING

CROSS-REFERENCE TO RELATED APPLICATIONS

This application is a continuation of U.S. patent application Ser. No. 17/738,980, filed May 6, 2022, which issued on Feb. 6, 2024 as U.S. Pat. No. 11,893,341, which is a continuation of U.S. patent application Ser. No. 17/374,877, filed Jul. 13, 2021, which issued on May 10, 2022 as U.S. Pat. No. 11,328,119, which is a continuation of PCT Application No. PCT/IB2021/054548, filed May 25, 2021, which claims the benefit of provisional U.S. Patent Application No. 63/029,556, filed May 24, 2020, each titled "Domain-Specific Language Interpreter and Interactive Visual Interface for Rapid Screening" and listing Sara Itani as inventor. The entire contents of the above-referenced applications and of all priority documents referenced in the Application Data Sheet filed herewith are incorporated by reference herein, in their entireties, for all purposes.

FIELD

This disclosure is directed to improved systems and methods of allowing a user of a computing system to explore and filter data in a domain-specific attribute-rich data set to test winnowing strategies and discover targets of particular interest.

BACKGROUND

Sifting through large volumes of data to find something worthwhile is often a daunting task. Metaphors like "looking for a needle in a haystack" and "searching high and low" express the challenge of, for example, a hiring manager finding a set of candidates to interview for a job, a homebuyer identifying a small number of houses to consider for touring before purchasing, or an investor screening securities to choose a group of stocks worth considering as investments.

The stock market, for example, presents the investor with a vast number of securities, where a vast amount of information is available about each security from a vast number of sources. To make the process of picking securities of interest more manageable, investors may screen securities against some criteria to narrow the list down. The result is a smaller list; whether the remaining securities are more promising or not depends on the investor's choice of criteria and sophistication in choosing and verifying them. Based on the huge number of available criteria for narrowing the list down-some useful, some worthless, some that will turn out to be misleading-even screening securities effectively can be fraught.

Strategies for screening may attempt to reflect an investor's investment philosophy, or they may be generally treated as a formality or sporadically used to back up hunches.

BRIEF DESCRIPTION OF THE DRAWINGS

FIG. 5A illustrates an example user interface of a rapid screening system configured for equities screening, showing domain-specific flexible text matching and completion suggestions in accordance with one embodiment.

FIG. 5B illustrates an example user interface of a rapid screening system configured for equities screening, showing data tag exploration in accordance with one embodiment.

FIGS. 6A-6B illustrate an example user interface of a rapid screening system configured for equities screening, showing filtering on a criterion in accordance with one embodiment.

FIG. 7 illustrates an example user interface of a rapid screening system configured for equities screening, showing an expression assigned to a custom variable name in accordance with one embodiment.

FIG. 12 illustrates an example user interface of a rapid screening system configured for equities screening, showing automatic display of links to 10-K filings in accordance with one embodiment.

FIGS. 16A-16B illustrate an example formula for a prior art system and corresponding example expressions for a rapid screening system configured for equities screening, showing improved ease of use in accordance with one embodiment.

FIG. 19A illustrates an example AI feature for introspection in a rapid screening system configured for equities screening, in accordance with one embodiment.

FIG. 19B illustrates an example AI feature for prediction in a rapid screening system configured for equities screening, in accordance with one embodiment.

FIG. 22 illustrates an example AI feature for feature suggestions in a rapid screening system configured for equities screening, in accordance with one embodiment.

FIG. 23 illustrates an example user interface of a rapid screening system configured for equities screening, showing creative uses of operators in accordance with one embodiment.

FIG. 25 illustrates an example user interface of a rapid screening system configured for equities screening, showing a point-in-time situation report of forecasts in accordance with one embodiment.

FIG. 29 is a schematic diagram illustrating several components of an example server system for implementing a rapid screening system in accordance with one embodiment.

DETAILED DESCRIPTION

Figure 1:
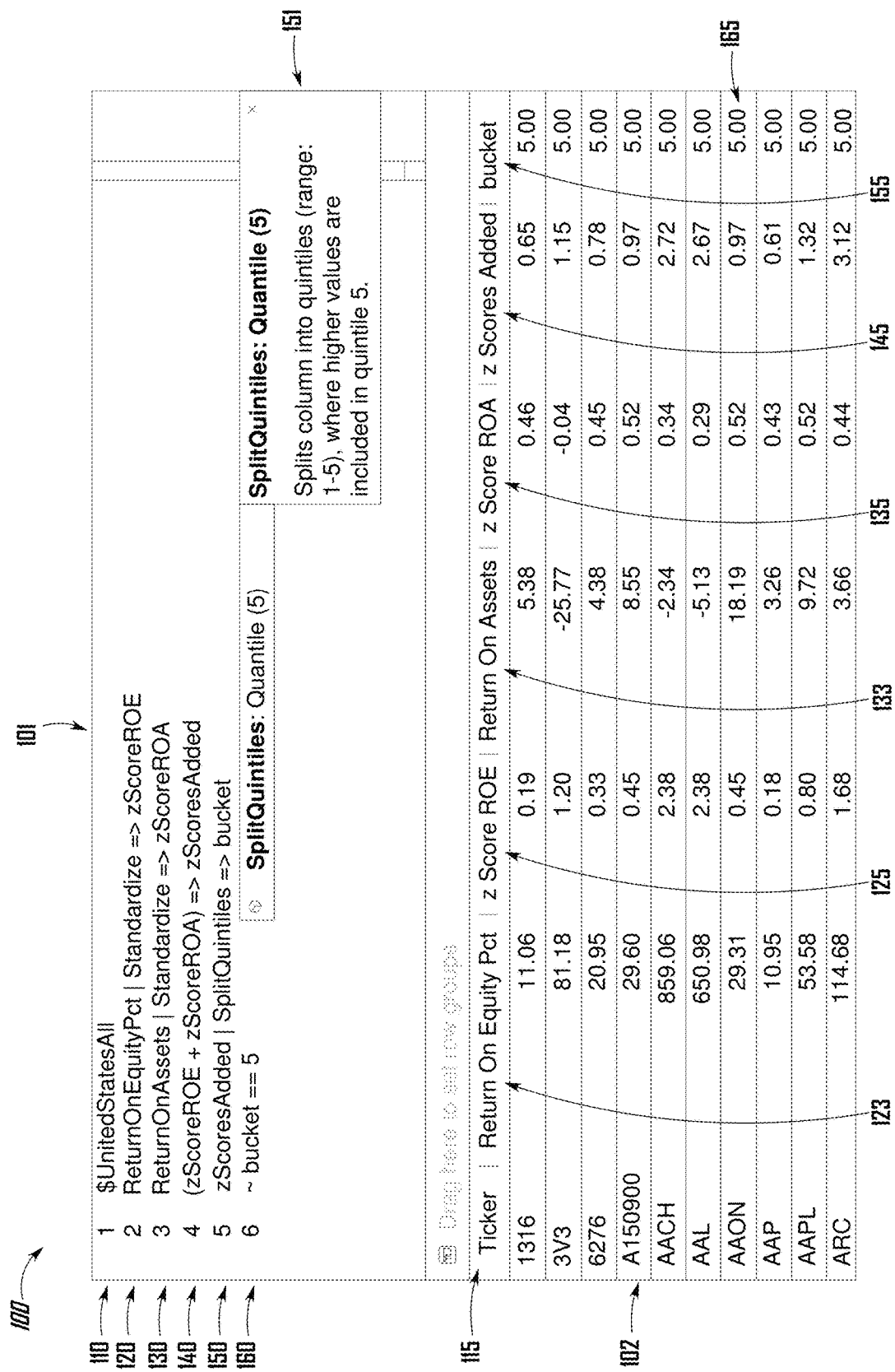
FIG. 1 illustrates an example user interface of a rapid screening system showing a multiline editor and a grid view display configured for equities screening, in accordance with one embodiment.

This application discloses improved systems and methods that allow a user of a computing system specially configured for a domain to explore and filter data in an attribute-rich data set to test winnowing strategies and discover targets of particular interest.

The disclosed technology utilizes a novel, intuitive approach including a domain-specific language interpreter and an interactive visual interface that together respond immediately to entered symbols and operators in the domain-specific language. The technology includes an input interface such as a multiline editor that allows the user to enter, amend, add, insert, subtract, change, and otherwise freely edit the entered symbols and operators at any time. The domain-specific language interpreter processes the entered symbols and operators on a continual basis as they are updated. The interactive visual interface also includes a grid view that displays live results that update according to the current contents of the input interface.

The technology further provides high-speed concurrent evaluation of chosen targets against historical data and benchmarks, enabling strategies to be backtested in seconds. The technology also includes artificial intelligence (AI) machine learning features to assist the user in, e.g., identifying strategies or factors driving them, finding similar targets, and considering different evaluation criteria.

For example, as applied to securities information, the systems and methods disclosed herein provide an improved approach to screening securities.

Together, the various aspects of the disclosed technology provide high ease of use with a short learning curve, and provide immediate feedback to enable quick refinement of iterative search strategies for exploring, visualizing, and filtering structured and/or unstructured data. The domain-specific language and the associated interpreter and interactive visual interface put together data exploration, querying, visualization, and the goals at hand together into one central workflow. The structure of the domain-specific language and the immediate, user-friendly feedback provided by the rapid screening system combine to encourage iterative discovery and exploration, making it possible for the user to visualize the effects of their screening criteria and making it easy enough for a user who only has business spreadsheet experience to quickly perform complex screening operations. Thus, a person without technical expertise who wants to find answers can obtain them through the presently disclosed technology without having to rely on a different person or team having such expertise. As a further result, the user is able to explore options and refine their thinking in real time based on the features provided by the technology.

In addition, the technology of the present disclosure allows a fundamental shift in processes for idea generation, winnowing, researching, testing, executing, and monitoring a strategy (e.g., an investment strategy). In the past, each of those processes would be handled separately. The disclosed technology uniquely synthesizes all of them. The present technology replaces disjoint processes performed by different people with limited, separated feedback loops and puts it all together into one language, tool, and interface with an integrated immediate feedback loop.

The technology described in the present disclosure that provides the foundation for the disclosed rapid screening system includes advances and insights in compilers, human-computer interfaces or interactions (HCI), programming language design, database engineering, distributed computing, machine learning, quantitative analytics, and finance. As a result, the improvements of the present disclosure as a whole combine improvements in several disparate arts and would generally not have been obvious to a person of ordinary skill in any one art.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, different or additional input interfaces (e.g., drop-down menu selectors or natural language processing) may be added to or combined with those illustrated, without limiting the scope to the embodiments disclosed herein. For example, the embodiments set forth below are primarily described in the context of equities screening. However, the embodiments described herein are illustrative examples and in no way limit the disclosed technology to any particular application, domain, body of knowledge, type of search, or computing platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The disclosed rapid screening systems and methods can take a variety of form factors. FIGS. 1 through 29 illustrate several different arrangements and designs. The illustrated rapid screening systems are not an exhaustive list; in other embodiments, a syntax could be rearranged (e.g., "only" or "limit" instead of "filter" or "~"), or an input editor or a results display could be formed in different arrangements. However, it is not necessary to exhaustively show such optional implementation details to describe illustrative embodiments.

FIG. 1 illustrates an example user interface 100 of a rapid screening system showing a multiline editor 101 and a grid view display 102 configured for equities screening, in accordance with one embodiment. The user interface 100 may be provided by one or more rapid screening system computing devices such as local or remote servers, described in greater detail below with reference to FIG. 27, FIG. 28, and FIG. 29. In the illustrated user interface 100, the rapid screening system provides a user a multiline editor 101 in which the user has entered symbols 110, 120, 130, 140, 150, 160 on a series of lines numbered 1-6.

Each of the lines 1-6 contains symbols 110-160 that are part of a domain-specific language (in this case, a language specific to the domain of securities). The symbols 110-160 represent one or more of: a universe of identifiers to start from, each identifier representing a member of the universe; data tags for data values, each data value associated with an identifier; operators that work on data values; and/or filter criteria for limiting or narrowing the universe of identifiers to be considered.

A specification defines a domain-specific language. The domain specific language is focused on the domain and thus may include constraints vis-à-vis general-purpose programming tools or languages. A general-purpose language like Python or Structured Query Language (SQL) is, by contrast, a cross-domain programming language and not a domain-specific language. A majority of the syntax in the domain-specific language is domain-specific terms, such that a person of ordinary skill in the domain would recognize the majority of the syntax in the domain-specific language. This means the domain-specific language contains very little programming-specific syntax and is not suited for general-purpose programming. It also means that a user can obtain results without any "programming" whatsoever: the rapid screening system will display results even if the user enters just one data tag because it is semantically meaningful and thus human-readable as well.

In various embodiments, the domain-specific language contains symbols that represent either data (including results of operations on data) associated with an identifier, or a filtering operation to select among identifiers.

In some embodiments, the domain-specific language contains no non-domain-specific keywords. In that case, operators are all symbols (such as "+" or brackets "[" . . . "]"). As a result, all alphabetic text that a user enters in the multiline editor 101 can be understood to be meaningful, e.g., a data tag. In some embodiments, the domain-specific language contains no non-domain-specific keywords other than transformation functions.

Data tags each represent a data value associated with an identifier (e.g., a security, which may be identified by a unique security ID and/or a recognizable stock ticker symbol for example) including values that are calculated from other values, such as the results of expressions. In many embodiments, data values are also associated with a date, a date span, or a series of dates. Types of data values may include, for example, numeric values (e.g., most recent price or return on equity ("ROE") for a security), string values (e.g., country or sector), arrays of multiple values (e.g., ROE for each of the last 4 quarters or recent news headlines), data structures/collections/serializations such as JSON (JavaScript Object Notation) or XML (eXtensible Markup Language) or HTML (HyperText Markup Language) or CSV (comma-separated values) data (e.g., information about a 10-K filing including its date and a hyperlink), etc.

An expression is a finite, well-formed combination of data tags and operations in the domain-specific language; a line of user input may be interpreted as one expression or multiple expressions. Expressions entered by the user are each evaluated to produce one of the above types of data value for each identifier (e.g., concatenating or otherwise combining strings to produce a new string, or calculating a standardized, weighted mixture of ROE and return on assets ("ROA") to generate a new numeric value). Expressions may use standard mathematical operators like '+' or '*', for example. Thus, an expression results in a data value that is calculated from other data values, including from other expressions.

Transformations are expressions that generate metadata characterizing data values for an identifier against a reference, such as over time, against a standard distribution, or in comparison to other securities (e.g., average, rank, quintile, standardize, trend stability, etc.).

Variable names represent any set of data values (e.g., the value of any expression that the user wants calculated) that a user assigns to an arbitrary user-chosen variable name, which then becomes a custom data tag that represents that data value, for ease of later reference. In this way a user can expand the domain-specific language.

Universes of identifiers to consider and screen (e.g., securities) may include pre-defined sets (all stocks, all members of the S&P 500®, all foreign securities, all U.S. large cap stocks, company or government bonds, etc.) and/or user defined custom sets or templates.

Matching operators provide, e.g., numerical comparators (e.g., <, <=, ==, >=, >, ?=/< >) (e.g., Revenue >10M) [in various embodiments, shorthand units can be processed and/or displayed, e.g., M for million or k for thousand] or text comparators like 'contains' or 'is' or '?' (e.g., TickerSymbol ? "AAPL" or Latest10K contains "china tariffs"). In some embodiments, an operator like 'contains' is implemented without alphabetic text. For example, using bracket notation to indicate an "includes" "has" or "contains" relationship, the syntax could be "Filings10k["china tariffs" ]". This provides an intuitive representation of one thing (the phrase "china tariffs") within another thing (a set of company 10-K filings) and avoids non-domain-specific keywords in an otherwise domain-specific language.

Filtering operators select identifiers that match some data value or expression criterion according to one or more matching operators (e.g., ~RoE>0 or Price <100). In various embodiments, filtering results in displaying a reduced-size universe or a smaller portion of the initially selected universe, and displays a data value corresponding to the criterion used for filtering.

In various embodiments, the domain-specific language is processed through an environment or tool such as the rapid screening system illustrated in FIG. 1, which includes an interactive multiline editor configured to accept user input (e.g., from a keyboard, voice recognition or natural language processing, on-screen buttons, a dropdown menu, and/or a contextual menu item selection, among various input options, some of which may be displayed in lieu of the editor); a parser and an interpreter configured to interpret the input according to the specification defining the domain-specific language; a server engine configured to obtain structured and/or unstructured data related to the domain, according to the input; and a visualization tool configured to provide a live updating results display or grid view as the user enters input into the interactive editor. In various embodiments, each expression and/or data tag entered in the editor corresponds to a column of information displayed in the grid view.

The results data is presented in a manner that can be meaningfully interpreted and easily visualized by the user, unlike existing systems. This cuts down on time that the user must spend ensuring that they are pulling down the right data and potentially cleansing it. This also makes it easier to spot patterns and relationships. Thus, the rapid screening system helps illustrate investment strategies for users: unlike a traditional screener, the systems and methods of the present disclosure allow rapid discovery and exploration of data; testing of different ideas to validate or invalidate those ideas; flexible generation of custom indicators and indices; repeatable processes; identification of trends, commonalities, and characteristics; and actionable insights that can be directly applied to strategies.

Returning to FIG. 1, on the first line 110, the user has entered "$UnitedStatesAll". In this example (within the domain of securities), the "$" is a signifier that indicates a universe of identifiers, and the universe is all United States stocks. As used herein, an identifier represents a member of a universe—in the illustrated example, a particular security. Thus, the user has chosen to start by considering all U.S. stocks. Within the securities domain, a user could alternatively choose to consider, e.g., other types of securities such as corporate or government (e.g., municipal) bonds, options, mutual funds, etc.; equities from other countries; stocks traded on a particular exchange; industry-specific securities; fixed-income financial products; non-performing loans; derivative securities; and so on. While this disclosure generally uses the terms "equities," "stocks," or "companies" as a convenient shorthand, the intent of the present disclosure is to encompass all securities with those terms.

Below the multiline editor 101, a grid view display 102 is illustrated. In other embodiments, the arrangements of the multiline editor 101 and the grid view display 102 may be different; e.g., with the editor below, or side-by-side, or in different windows or screens entirely. The grid view display 102 includes a series of columns 115, 123, 125, 133, 135, 145, 155. Each of the columns corresponds directly to a symbol or expression in the multiline editor 101. For example, the depicted "Ticker" column 115 corresponds to the "$UnitedStatesAll" universe of all U.S. stocks. The "Ticker" column 115 displays a series of rows, one row for each identifier associated with the universe of all U.S. stocks. Thus, each U.S. stock is identified in the "Ticker" column 115 by its ticker symbol. Tickers are just a display name, and in various implementations the technology uses unique identifiers to unambiguously identify each security. For example, each of the members of the selected universe may be identified by its full name and exchange, or, e.g., by some other unique identifier such as a security ID. This is particularly useful to support international equities.

In other embodiments of the technology, the grid view display 102 may be arranged differently, such as with each column representing a security (or other screening target) and each row representing attributes of the security, with nested tables, or other equivalent arrangements, which are within the scope of this disclosure.

In various implementations of the illustrated column and row format, the data values in each column are sortable, such as by user interaction with the column heading (e.g., a mouse click to sort, reverse, or restore a sorting order, or a contextual menu). In various implementations, the columns themselves are reorderable. For example, the grid view display 102 may provide a control for a column to be shifted left or right relative to another column, dragged (e.g., by a mouse click-and-drag operation) to a different position among the columns, hidden or closed (or re-shown), or minimized (e.g., as an icon that indicates a set of data or a grouping that can be re-expanded). In some embodiments, when a column of information is moved or removed in the grid view, the interface displays an indication with the corresponding expression and/or data tag in the editor, such as a control to allow the column to be re-shown or a notation indicating that the column is displayed out of the original order. In some embodiments, when a column of information is moved or removed in the grid view, the system updates the code in the editor as well.

Continuing in the multiline editor 101, on the second line 120, the user has entered "ReturnOnEquityPct|Standardize=>zScoreROE". While the specific syntax of the illustrated example will be described below in greater detail, the technology encompasses various equivalent alternatives and is not limited to the exact domain-specific language illustrated. In this example, the user has first selected or entered a data tag, "ReturnOnEquityPct". As used herein, a data tag represents an attribute of each of the members of a given universe; the data tag labels or refers to a particular data value associated with each identifier. For example, in the universe of all U.S. stocks, ReturnOnEquityPct refers to, for each company having a stock in that universe, a percentage return on equity. Similarly, as shown in this example on the third line 130 in the multiline editor 101, ReturnOnAssets refers to, for each such company, a return on assets.

Thus, in the grid view display 102, column 123 shows the "Return On Equity Pct" data tag in the header line at the top of the column, and displays data values listing the percent return on equity for each ticker symbol shown in the corresponding row. In the illustrated example, the screen is run as of the current date. In various embodiments, the system allows a screen to be run on a previous "as of date" as well.

Lines 120 and 130 start with the ReturnOnEquityPct and ReturnOnAssets data tags and proceed with expressions that transform each of them by standardizing each of them to a normal distribution, producing a z-score. In some embodiments, a standardizing function first Winsorizes values to reduce outlier effects, replaces null values with a median, etc. The illustrated expressions then assign those z-scores to custom-named variables or data tags, "zScoreROE" and "zScoreROA", respectively. Accordingly, column 125, under the heading "z Score ROE", displays normalized z-scores for return on equity percentage for each stock (represented by its ticker symbol in column 115); and column 135, under the heading "z Score ROA", similarly displays normalized z-scores for return on assets for each stock.

Line 140 in the multiline editor 101 is an expression that adds the zScoreROE and zScoreROA data tags and assigns them to a new variable or data tag, "zScoresAdded". Column 145 in the grid view 102 thus has the heading "z Scores Added" and displays a new data value for each stock identifier having a ticker symbol in column 115. The data values in column 145 are the sums of the data values in columns 125 and 135.

In this example, apparent rounding can be observed: the displayed values are automatically limited to two decimal places to enhance readability in the screening process, while the system can operate on the precise numbers underlying the displayed data values. In other embodiments, use of significant digits or other approaches to provide ease of use may be employed. In some embodiments, a user action such as hovering over, right-clicking, copy-pasting, or long-pressing a data value may reveal additional details regarding that value.

Continuing in the multiline editor 101, on the fifth line 150, the user has entered the expression "zScoresAdded|SplitQuintiles=>bucket". As shown in the function suggestion pane and explanatory text 151, the SplitQuintiles function in this example sorts the data values for zScoresAdded across the current set of identifiers (e.g., security IDs, even where recognizable ticker symbols are displayed) into quintiles, in which, e.g., the lowest quintile is assigned the value "1" and the highest quintile is assigned the value "5" (vice versa, in some systems). Thus, among all U.S. stocks, companies for which the combined return on equity percentage (standardized) plus return on assets (standardized) are in the bottom 20% have a value of "1" in column 155, and companies for which they are in the top 20% have a value of "5" in column 155, and others have a "2", "3", or "4" in column 155. In the grid view 102, the heading of column 155 is "bucket" because in the multiline editor 101, the expression in line 150 assigns the quintile data tag to the custom variable "bucket."

On the sixth line 160, the user has entered the expression "~bucket=5". The tilde in this expression, in the syntax of this illustrative example, represents a filtering operation. This operation enables the user to filter, limit, reduce, or narrow the previously displayed set of identifiers according to a matching criterion. In this case, once the rapid screening system processes the filtering expression in line 160 in the multiline editor 101, the grid view 102 no longer displays all the identifiers (or for convenience, stock ticker symbols) in the full universe of all U.S. stocks. Instead, only stock tickers for which the custom variable "bucket" has a data value of "5" 165—i.e., the highest quintile of standardized combined return on equity percentage and return on assets—are included in the updated grid view 102.

Thus, the disclosed rapid screening system allows a user to perform sophisticated screening of high volumes of multi-attribute data—and to do so far more easily than previous systems allowed, with minimal syntax, and with unprecedented continual, effectively immediate feedback and results.

Figure 2:
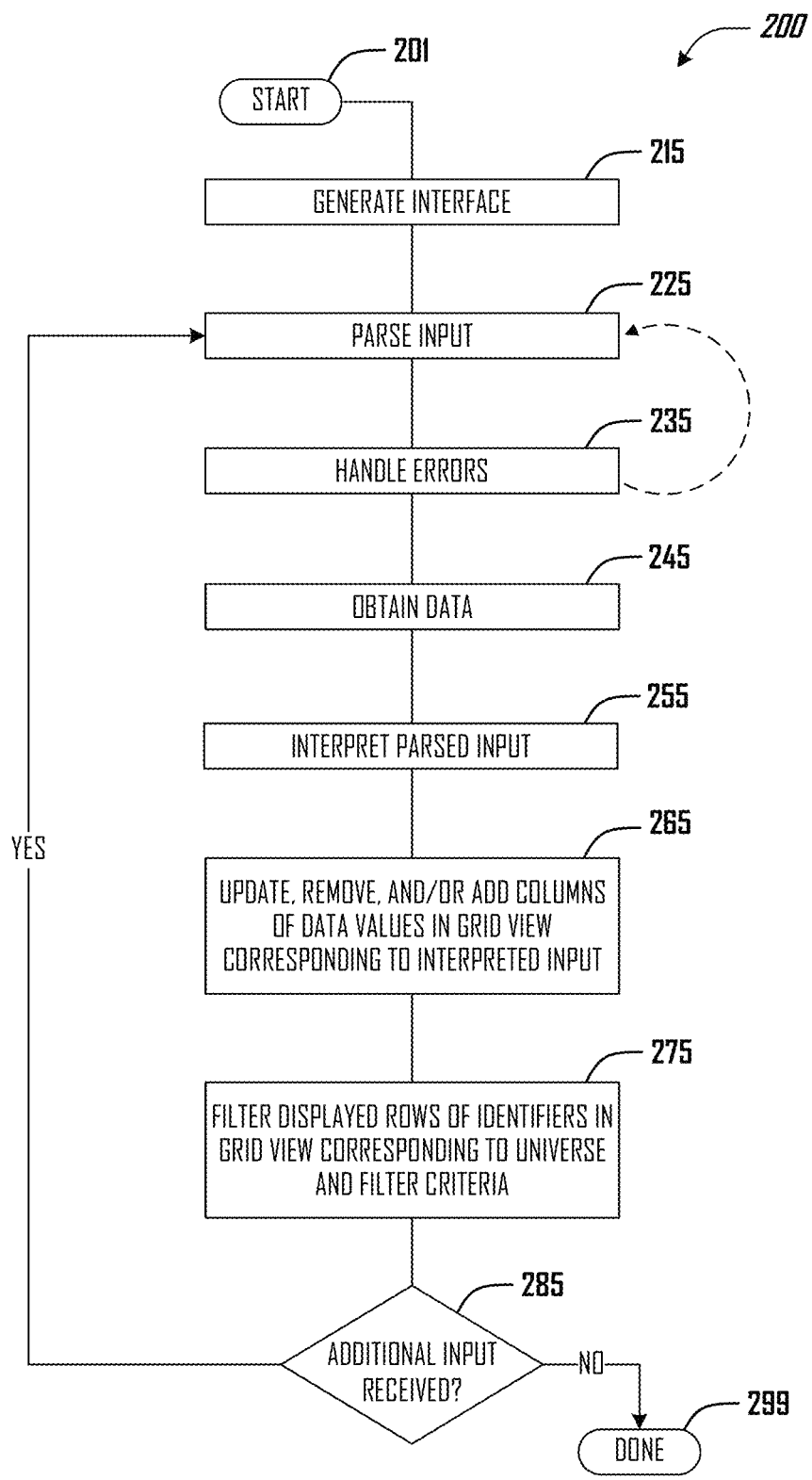
FIG. 2 illustrates an operational routine of a rapid screening system in accordance with one embodiment.
Figure 3:
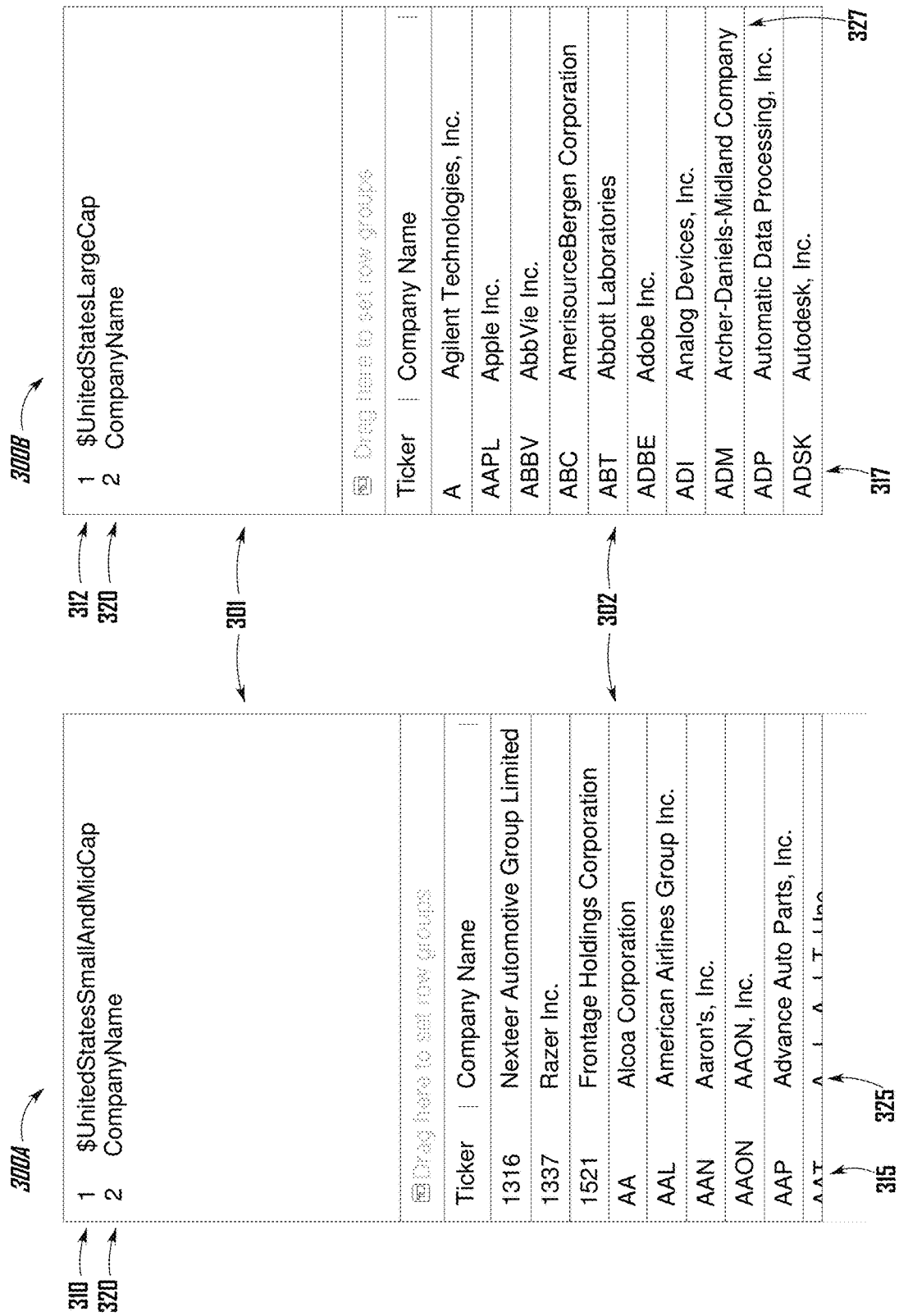
FIGS. 3A-3B illustrate an example user interface of a rapid screening system configured for equities screening, showing a revision within the multiline editor in accordance with one embodiment.

FIG. 2 illustrates an operational routine 200 of a rapid screening system in accordance with one embodiment. In various embodiments, the operational routine 200 is performed by one or more rapid screening system computing devices such as local or remote servers, described in greater detail below with reference to FIG. 27, FIG. 28, and FIG. 29. The operational routine 200 begins in starting block 201.

FIG. 2 and the flow diagrams and schematics that follow are representative and may not show all functions, steps, or exchanges of data; instead, they provide an understanding of how the system can be implemented. Those skilled in the relevant art will recognize that some functions may be repeated, varied, omitted, or supplemented, and other (less important) aspects not shown may be readily implemented. Those skilled in the art will appreciate that the blocks shown in FIG. 2 and in each of the schematic diagrams discussed below may be altered in a variety of ways. For example, while processes or blocks are presented in a given order, alternative implementations may perform routines in a different order, and some processes or blocks may be rearranged, deleted, moved, added, subdivided, combined, and/or modified to provide alternative or sub-combinations. Each of these processes or blocks may be implemented in a variety of different ways. Also, although processes or blocks are at times shown as being performed in series, these processes or blocks may instead be performed or implemented in parallel, or may be performed at different times. Some of the blocks depicted in FIG. 2 and the other schematic diagrams are of a type well known in the art, and can themselves include a sequence of operations that need not be described herein. Those of ordinary skill in the art can create source code, microcode, program logic arrays, etc., or otherwise implement the disclosed technology based on the diagrams and the detailed description provided herein.

In block 215, the operational routine 200 generates an interface for user input and/or the display of results to be rapidly screened. For example, in one embodiment, which will be used as an example to illustrate various operations described below, the operational routine 200 provides an interactive editor (such as the multiline editor 101 of FIG. 1) and a results grid view (such as the grid view 102 of FIG. 1). In various embodiments, the rapid screening system causes the interface for user input and/or the display of results to be presented on a client device remote from a rapid screening system server.

In block 225, the operational routine 200 obtains input, e.g., via the interactive editor provided in block 215, and parses the input in relation to a domain-specific language specification or grammar. The domain-specific language specification or grammar may contain, e.g., terms representing data tags from the specific domain, such that a user who has knowledge of the domain can use that knowledge to discover a term in the domain-specific language. For example, in the domain of securities, and of stocks in particular, "ROE" is common shorthand for "return on equity", which is a measure of profitability or financial performance calculated by, e.g., dividing annual net income by shareholders' equity (assets minus liabilities). Thus, if the rapid screening system is configured for such a domain and receives input of "roe" from a user, the operational routine 200 can parse the input as a request for a data tag named "ROE" or "ReturnOnEquity" using text pattern matching.

In various implementations, parsing the input in block 225 includes performing lexical analysis of the input to identify symbols or tokens from the domain-specific language specification or grammar in the input, and performing syntactical analysis to turn the input symbols into an abstract syntax tree (AST).

In block 235, the operational routine 200 handles parsing errors. For example, a user may type "roe" when the domain-specific language does not contain a data tag named "roe" or "ROE". In some embodiments, the operational routine 200 records any errors (including, e.g., errors at other stages such as data retrieval) that prevent further progression through the operational routine 200 regarding the line with the error, and loops back to block 225 to process additional user input such as corrections. In various embodiments, the operational routine 200 processes as much as possible despite the error, and preserves results that existed before the error was encountered.

In some embodiments, the operational routine 200 identifies the unrecognized input for the user, such as by highlighting it. In some embodiments, the operational routine 200 may attempt to infer the closest match in the domain-specific language and, e.g., replace the unrecognized input with the closest valid match, or propose a set of potential replacements or completions of the unrecognized input. In various embodiments, the operational routine 200 continues to parse the user's input and to process the parser-recognized symbols.

In block 245, the operational routine 200 obtains any data necessary to perform operations on the data tags parsed in block 225. For example, if the parsed expression requires a set of data values not already loaded in a memory, the operational routine 200 identifies one or more data sources associated with the needed data values and loads the required information from at least one of the one or more data sources. In some embodiments, the operational routine 200 obtains data at another stage or on the fly.

In some embodiments, the operational routine 200 loads or pre-loads and caches a snapshot of slow-changing (in terms of volatility or stability of amplitude and/or frequency of change), recently displayed, and/or frequently requested data values for a set or subset of identifiers and/or data tags, to speed processing when a user's input requires such data values. In some embodiments, the operational routine 200 identifies relevant data tags (e.g., based on user history, popularity across users, availability, etc.), prefetches them (e.g., in parallel), and caches the data locally to provide results to the user rapidly.

In block 255, the operational routine 200 interprets the parsed input. For example, if the user enters an expression, the operational routine 200 identifies the data values to which the parsed symbols refer, determines what operations should be performed, and executes the required operations. For example, the operational routine 200 can interpret the AST and evaluate each parsed expression. In some embodiments, the operational routine 200 operates on a line-by-line basis. In some embodiments, the operational routine 200 evaluates each input line in order.

In some embodiments, the operational routine 200 interprets and executes input as soon as the input is parsed, on a continual basis (e.g., without waiting for a user to stop typing), so that the interface will update as soon as possible as input is entered and results are obtained, and the user does not have to finish entering input before deciding to execute the completed input. Results may be considered "live" if they are updated immediately or after a short delay whenever user input changes (and optionally whenever underlying data changes). Providing live results increases learnability of the interface in addition to facilitating learnability and exploration of datasets themselves. In some embodiments, the operational routine 200 interprets and/or executes input after a short delay (e.g., a "debounce" period of from about a tenth of a second up to about 1-5 seconds, or as soon as a user pauses while typing) to allow the user to finalize or amend or revise input before the rapid screening system finishes processing it. In some embodiments, the operational routine 200 applies such a "debounce" period to the display of results, as further described below. Such delays can help the operational routine 200 present results when the user is ready, improving the user's perception of receiving immediate, responsive results.

In various embodiments, the operational routine 200 provides incremental interpretation, only interpreting and executing statements, expressions, or lines affected by user input. For example, if the operational routine 200 receives, parses, and interprets an expression on a fifth line, the operational routine 200 can maintain the contents of the first four lines without change to minimize processing time. By incrementally interpreting and by combining new or changed elements with the previous results where possible, the rapid screening system maximizes the responsiveness of the interface.

In various embodiments, the domain-specific language is fast for the operational routine 200 to interpret 255 for a combination of several reasons: because the interpreter can take advantage of its design for concurrency and data sharding (e.g., across time, data items, and user-specific patterns); the language is domain-specific and therefore highly specialized and optimized to a task rather than suitable for general-purpose computing; only the results that need to be visible to the user are sent to the client; it is designed for incremental interpretation; and the language itself allows a semantic understanding of user actions, making it possible to optimize the query planner. In addition, the backend system is arranged to provide fast results based in part on the constraints on the domain-specific language, as discussed further below with reference to FIGS. 27-29.

In block 265, after the input has been parsed and interpreted, the operational routine 200 updates, removes, and/or adds categories to the interface for the display of results corresponding to the interpreted input from the interface for user input. For example, in the grid view embodiment example, when the rapid screening system interprets an expression newly invoking a data tag, the operational routine 200 adds a column with a heading associated with that data tag in the grid view. In some embodiments, the operational routine 200 generates a new column heading name for an expression not expressly named by the user.

In some embodiments, when the operational routine 200 is obtaining data as described in block 245, the operational routine 200 may display a column for the data tag and fill in the data values as they are received. In some embodiments, the operational routine 200 displays a column for each calculation or newly introduced data tag in each statement or expression (e.g., each line in a multiline editor), providing transparency and understanding (and aiding in debugging) because all of the intermediate steps are visible. In some embodiments, the operational routine 200 displays one column for each statement or expression, and hides intermediate calculations by default. When a user edits or deletes an expression, the operational routine 200 correspondingly changes or removes the data tag and data values no longer included in the input. In various embodiments, the operational routine 200 incrementally updates the results display by combining new or changed elements with the previous results to minimize processing and rendering time and thus maximize the responsiveness of the interface. In some embodiments, the operational routine 200 obtains data as described in block 245 and displays the results only when sufficient data to display to the user has been received. For example, rather than display a heading above a mostly empty column in a grid view display while results are being obtained, the operational routine 200 can assemble the results (e.g., a large portion or all of the result values, or of those result values that will be initially visible to the user) before updating the display. Adding complete or mostly compete results to the display at once when the values are ready rather than piecemeal as they are loaded can help the operational routine 200 present results in a way that improves the user's sense of receiving immediate results. In general, results presented within several seconds of the user completing an expression or line of input is perceived as "immediate." A user may discount a startup delay, e.g., for initial loading of a complex data set, when judging whether an interface thereafter provides immediate responsiveness in presenting results.

In block 275, after the input has been parsed and interpreted, the operational routine 200 filters the displayed identifiers that correspond to the selected universe of identifiers and the active filter criteria. For example, in the grid view embodiment example, when the rapid screening system interprets an expression filtering data values associated with a data tag, the operational routine 200 determines what identifiers match the filtering criteria and displays only matching identifiers and the data values associated with the matching identifiers. In some embodiments, the operational routine 200 continuously builds up a result set with the entry of each input line or expression. In some embodiments, as results data are obtained, the operational routine 200 inserts the result set into a database for displaying the results (e.g., for a client to request a subset of data that will be initially visible to the user so that the client can actually display that subset of the entire result set).

In some embodiments, the operational routine 200 can use results from an existing session with the user.

In block 285, the operational routine 200 determines whether additional input is received, e.g., via the interface for user input. In some embodiments, the operational routine 200 may process additional input (including modification or deletion of previous input, at any location in the previous input) asynchronously and without waiting for other blocks (e.g., obtaining data 245) to be complete, or may cancel the processing of previous input to respond to new or changed input to ensure rapid display of the most recently requested data. In other words, the operational routine may determine whether additional input is received at any time. If additional input is received, the operational routine 200 loops back to input parsing block 225 to process the next input symbol, if any.

The operational routine 200 ends in ending block 299.

FIGS. 3A-3B illustrate an example user interface 300 of a rapid screening system configured for equities screening, showing a revision within the multiline editor in accordance with one embodiment.

In FIG. 3A, line 1 310 in the multiline editor 301 specifies a universe of "$UnitedStatesSmallAndMidCap" identifiers, i.e., U.S. stocks categorized as small- and mid-capitalization, and line 2 320 is a data tag for "CompanyName". Accordingly, in the grid view 302, the first column 315 displays stock ticker symbols (or, e.g., unique security IDs as proper identifiers) for stocks in the designated universe, and the second column 325 displays the associated company name for each identifier. While the illustrated example is US-stock focused, international securities could be chosen instead.

In FIG. 3B, line 1 312 is different: it now specifies a universe of "$UnitedStatesLargeCap" identifiers, i.e., U.S. stocks categorized as large-capitalization.

Line 2 320 is unchanged, a data tag for "CompanyName". In the grid view 302, the revised first column 317 displays a new set of stock ticker symbols (in place of identifiers) for stocks in the designated universe, and the second column 327 displays the associated company name for each identifier. In this example, the rapid screening system accepts revision of input on line 1 310-312 even after input has been entered and processed on line 2 320. The rapid screening system seamlessly processes such a change-completely replacing the universe of identifiers under consideration-without requiring the user to delete from the end of the input back to the change or otherwise to start over. In some embodiments, the rapid screening system allows the user to undo a change (e.g., through an undo stack, or with a keyboard stroke such as Control-z), and by caching results allows the user to quickly flip back and forth between dynamic results. By providing a flexible, freely editable multiline input and by continually refreshing updates in response to changing user input, the disclosed rapid screening system allows users to powerfully and quickly explore alternatives to identify a desired strategy, in a way that was not previously possible.

Figure 4:
FIG. 4 illustrates an example user interface of a rapid screening system configured for equities screening, showing a dialog to create a custom universe of stocks in accordance with one embodiment.

FIG. 4 illustrates an example user interface of a rapid screening system configured for equities screening, showing a dialog 400 to create a custom universe of stocks in accordance with one embodiment. A user may wish to create custom criteria for the starting universe of identifiers under consideration. For example, a real estate agent may specialize in a type or location of housing (e.g., downtown condominium units or exurban single-family homes), or an investor may focus on an industry category or company size. In various embodiments, the rapid screening system provides a convenient interface for defining a new or custom universe using various criteria, which can be optimized based on frequent use.

In the illustrated example, the dialog 400 prompts the user to give a name 410 to a custom universe of, e.g., stocks having chosen aspects 420 such as a specified country, a market capitalization range, a liquidity minimum, or a Global Industry Classification Standard (GICS®) industry category. In some embodiments, the available aspects 420 may include combinations of factors, e.g., a set of countries. In some embodiments, a custom universe can be composed of selected companies. Such a universe can be created by looking up names or loading a list of identifiers, for instance names in a portfolio. In this example, the dialog 400 also allows the user to select an index to benchmark against, such as the S&P 500. After receiving selections that define a universe of identifiers, the dialog 400 allows the user to select "Create Universe" 430 and then reference the custom universe by the chosen name.

In some embodiments, the rapid screening system allows a created universe to be shared with others, e.g., in a shared office environment, for collaboration among users.

Similarly, in some embodiments, the rapid screening system allows custom data tags, expressions, and entire screening sessions to be shared collaboratively. In some embodiments, a custom universe of identifiers can be edited or deleted after creation. In some embodiments, to enhance rapid screening system performance in the creation of a new universe, data relating to universe creation criteria (e.g., country, market capitalization, industry, etc. for stocks) is stored in separate database snapshot updated regularly (e.g., in memory data), so that information is quickly available to the client without needing to be retrieved from a database of securities information. In some embodiments, the domain-specific language itself can be used to define a universe.

FIG. 5A illustrates an example user interface 500 of a rapid screening system configured for equities screening, showing domain-specific flexible text matching and completion suggestions in accordance with one embodiment. As discussed above with reference to FIG. 2, the rapid screening system may flexibly match input against domain-specific terms to provide accurate on-the-fly term matching even when the input contains errors or is otherwise not an exact match. For example, in the multiline editor 501, the line 2 input 520 is "returonequit". That input leaves the "n" off the end of "return" (or, by another interpretation, includes an extra "o" in "return" and leaves out the word "on" entirely) as well as leaving the "y" off the end of "equity". Nevertheless, the disclosed rapid screening system displays a data tag suggestion pane and explanatory text window 521 at the cursor, highlighting matching letters of likely intended input data tags. The multiline editor 501 allows the user to select one of the provided options to immediately replace the incomplete and misspelled input. In contrast, prior systems such as spreadsheet formulas required character-perfect text and unintuitive cell number cross-references that a typographical error would ruin, and general-purpose tools such as an Excel® spreadsheet cannot provide semantic error handling and completions of terms that are domain-specific. By providing flexible text matching and domain-specific completion suggestions, the rapid screening system allows users to screen more easily and quickly than was previously possible.

FIG. 5B illustrates an example user interface 550 of a rapid screening system configured for equities screening, showing data tag exploration in accordance with one embodiment. The data explorer dialog 551 allows the user to discover an intended input data tag for immediate use. In various domains, the number of available data tags may be overwhelming to a user, numbering in the thousands or tens of thousands, across unlimited data sources, across tens of thousands or hundreds of thousands of securities. The example data explorer dialog 551 provides fields for a company name 555, search text 560, and a data package or data provider 565. In the illustrated example, the user searches for data tags related to the term "EBIT" (earnings before interest and taxes) for Microsoft Corporation that are available from a data package titled S&P Global—Fundamental Data. In some embodiments, user-entered text is assisted with an autocomplete feature to aid in rapid discovery. Matching data tags are listed in the results box 570, which shows a name, description, and values (for the current quarter and trailing twelve months) for each data tag.

Other embodiments include other properties or even full example snippets. In some embodiments, search text can match any of the information regarding a data tag, including values (e.g., a particular annual growth rate). Convenient user interface elements allow the user to select a desired data tag by double-clicking 575 a cell in the results box 570 to pin it, and using a button 580 to copy the selected data tag or tags. For example, a double click on the 8.163900 cell 571 would pin the data tag "Ebit10YrCagrPct" and if a double click on the 8.566600 cell 572 would pin the data tag "Ebit10YrCagrPctTtm" in the illustrated example, and either or both data tags could easily be copied to the clipboard for pasting into an expression. By providing such a domain-specific data explorer tool, the rapid screening system allows users to discover relevant data tags, explore available data tags, and screen data more easily, quickly, and effectively than was previously possible.

FIGS. 6A-6B illustrate an example user interface 600A-600B of a rapid screening system configured for equities screening, showing filtering on a criterion in accordance with one embodiment. As discussed above with reference to both FIG. 1 and FIG. 2, the rapid screening system allows the user to filter, limit, reduce, or narrow a set of identifiers according to an expressive matching criterion. In the illustrated example, the user interface 600A displays US large-cap stocks in column 615 of the grid view 602. The multiline editor 601 input 620 on line 2 is "ReturnOnEquityPctTtm", a data tag for each company's return on equity percentage for the trailing 12 months. The values for "Return On Equity Pct Ttm" are displayed in column 625 in the grid view 602.

Turning to user interface 600B, the multiline editor 601 input 622 on line 2 is now "~ReturnOnEquityPctTtm>40", adding a tilde ("~") filtering operator at the beginning of the line and a comparative condition ">40" after the data tag. Accordingly, the grid view 602 no longer displays all the identifiers (or their stock ticker symbols) in the specified universe of all U.S. large-cap stocks. Instead, only stock tickers in column 617 of companies for which the company's return on equity percentage for the trailing 12 months is greater than 40 are included in the updated grid view 602, in column 627. Because the data for ReturnOnEquityPctTtm for all the identifiers displayed in column 615 is already loaded by the system (and displayed in column 625), such a limiting operation can be accomplished with great speed.

In some embodiments, an express operator like "~" (or "filter", "limit", "only", etc.) is required (e.g., to enhance user-readability). In some embodiments, while an express operator may be allowed, a filter operation may be inferred from the presence of a comparison operator. Where filtering is inferred, or for all filtering operations, the rapid screening system may distinguish the line or statement (e.g., by decorating the statement or applying text formatting, a background color, etc.; and/or by inserting an explicit operator where omitted by the user and inferred by the system).

In some embodiments, the rapid screening system provides additional filtering-related operators, e.g., an 'OR' operator, a 'NOT' operator, and/or an enumeration (all X that are in Y), etc.

FIG. 7 illustrates an example user interface 700 of a rapid screening system configured for equities screening, showing an expression assigned to a custom variable name in accordance with one embodiment. As discussed above with reference to FIG. 1, the rapid screening system allows the user to create a new, custom variable name or data tag. For example, the rapid screening system allows any data tag to be given a new alias, and any expression (e.g., modifying data values associated with a data tag, or combining multiple data values) to be named so that it can be labeled helpfully and referenced again conveniently. The name can be applied to, e.g., a code snippet or an actual variable (so it doesn't need to be recomputed). Thus, and in conjunction with the ability to define custom universes as described above with reference to FIG. 4, a user can extend the domain-specific language to meet their own needs, e.g., defining universes, data tags, data sources, and/or transformations.

The illustrated statement 740 in the multiline editor 701 assigns the sum of two data tags, "ReturnOnEquityPct" and "ReturnOnAssets", to a custom-named variable or data tag, "MyCustomIndex". Accordingly, column 745, under the heading "My Custom Index", displays the sum of two data values-return on equity percentage and return on assets—for the company for for each stock ticker symbol displayed in the grid view 702. In some embodiments, the rapid screening system uses PascalCase (in which all words of a compound name are capitalized) as a convention to name data tags for user readability, and the results display interface (e.g., the headings line in grid view 702) automatically adds a space in appropriate locations in a data tag (e.g., between a lowercase letter and a following uppercase letter) to provide increased legibility. Other equivalent conventions for compound names in data tags without spaces include camelCase (in which all words after the first are capitalized), kebab-case (in which dashes separate words), and snake_ case (in which underscores separate words). In some embodiments, the rapid screening system uses dot notation to name variables, e.g., "ReturnOnEquity.™" or employs parentheses. In some embodiments, spaces are allowed in data tags, or the system parses input with spaces to identify an unambiguous matching data tag (or to suggest likely options if the input is ambiguous in the context of the domain-specific language and operators). By linking the variable name with the display output, the technology encourages non-programmers to write maintainable "code" naturally, because they can recognize whether a heading in the output looks correct.

In some embodiments, the system includes a natural language user interface, such as a written text or voice recognition interface. Natural language processing (NLP) often fails because human language is not constrained enough to obtain consistently reliable results. Because the disclosed technology provides a domain-specific language as an intermediate layer, results can be greatly improved. For example, a natural language request to "find me all companies that mention China tariffs in 10K filings" could be processed by a language model (e.g., GPT-3) to generate expressions in the domain-specific language. Because the domain-specific language is semantically meaningful, a human can understand the output, verify that the expression is doing what the natural language statement requested, and edit it if desired. Because expressions in the domain-specific language are so expressive within a short space, they are easily verifiable by the user, providing a more meaningful and readily trusted mode of interaction.

In contrast to most programming languages that declare a variable and then assign a value to it, in the illustrated embodiments the domain-specific language includes an assignment operator that operates after the result, psychologically encouraging users to explore various expressions (which are interpreted immediately as the user types or revises or replaces them) and then to assign a result (which is immediately displayed) to a user-named variable. This also ensures that the expression is "completed" faster: for example, while a formula or statement "A=awesome (param)" is not complete until the very end of the statement, the expression "param|awesome=>A" is complete throughout its construction.

Figure 8A:
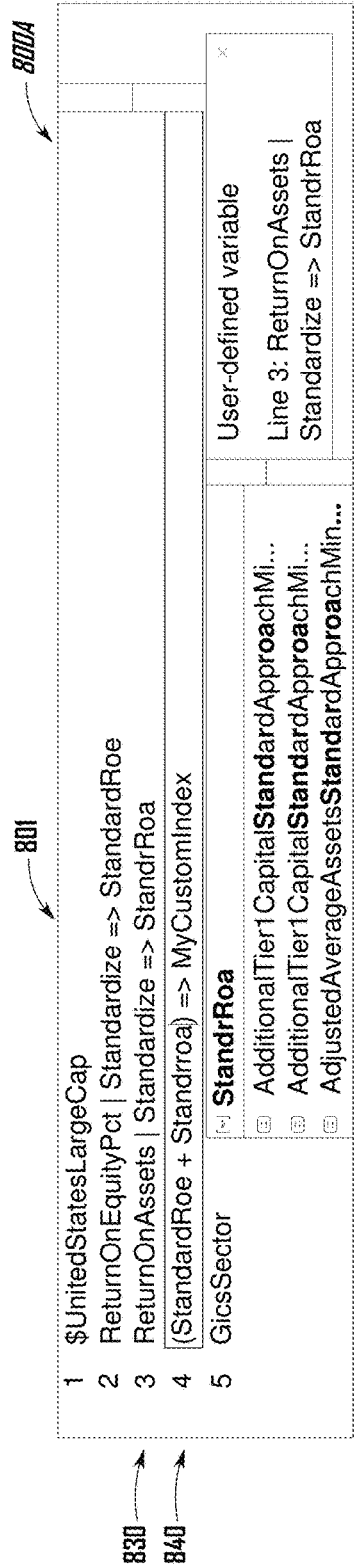
FIGS. 8A-8C illustrate an example user interface of a rapid screening system configured for equities screening, showing simultaneous renaming of multiple references to a custom variable name in accordance with one embodiment.
Figure 8B:
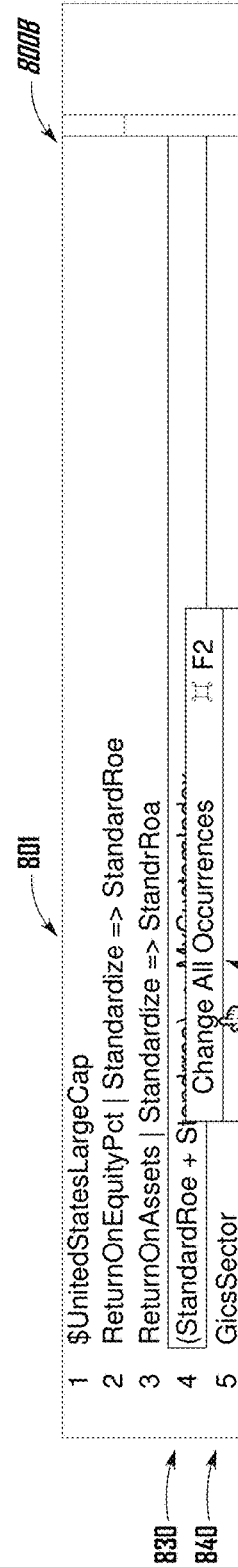
Figure 8C:
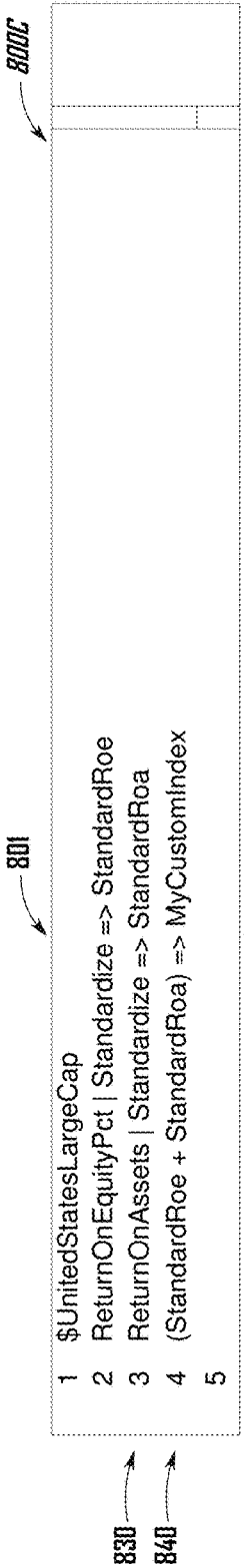

FIGS. 8A-8C illustrate an example user interface 800A, 800B, 800C of a rapid screening system configured for equities screening, showing simultaneous renaming of multiple references to a custom variable name in accordance with one embodiment. In the illustrated example, in input 830 in line 3 of the multiline editor 801, the user has defined a custom variable or data tag named "StandrRoa". In addition, in input 840 in line 4 of the multiline editor 801, the user has entered an expression that refers to the custom "StandrRoa" variable or data tag. In FIG. 8A, the rapid screening system displays a data tag suggestion pane and explanatory text window 841 at the cursor in line 4, highlighting "StandrRoa" as a recognized user-defined variable. In FIG. 8B, a highlighted selection in a contextual menu 842 in the multiline editor 801 provides the user the ability to "Change All Occurrences" of a custom variable name. In FIG. 8C, the multiline editor 801 has allowed the user to change "StandrRoa" to "StandardRoa" simultaneously in multiple locations. The rapid screening system thus enables a consistent global change to a variable name without breaking any of the variable references. Conventional in-domain search systems, by contrast, do not provide any ability to refactor text entry.

Figure 9:
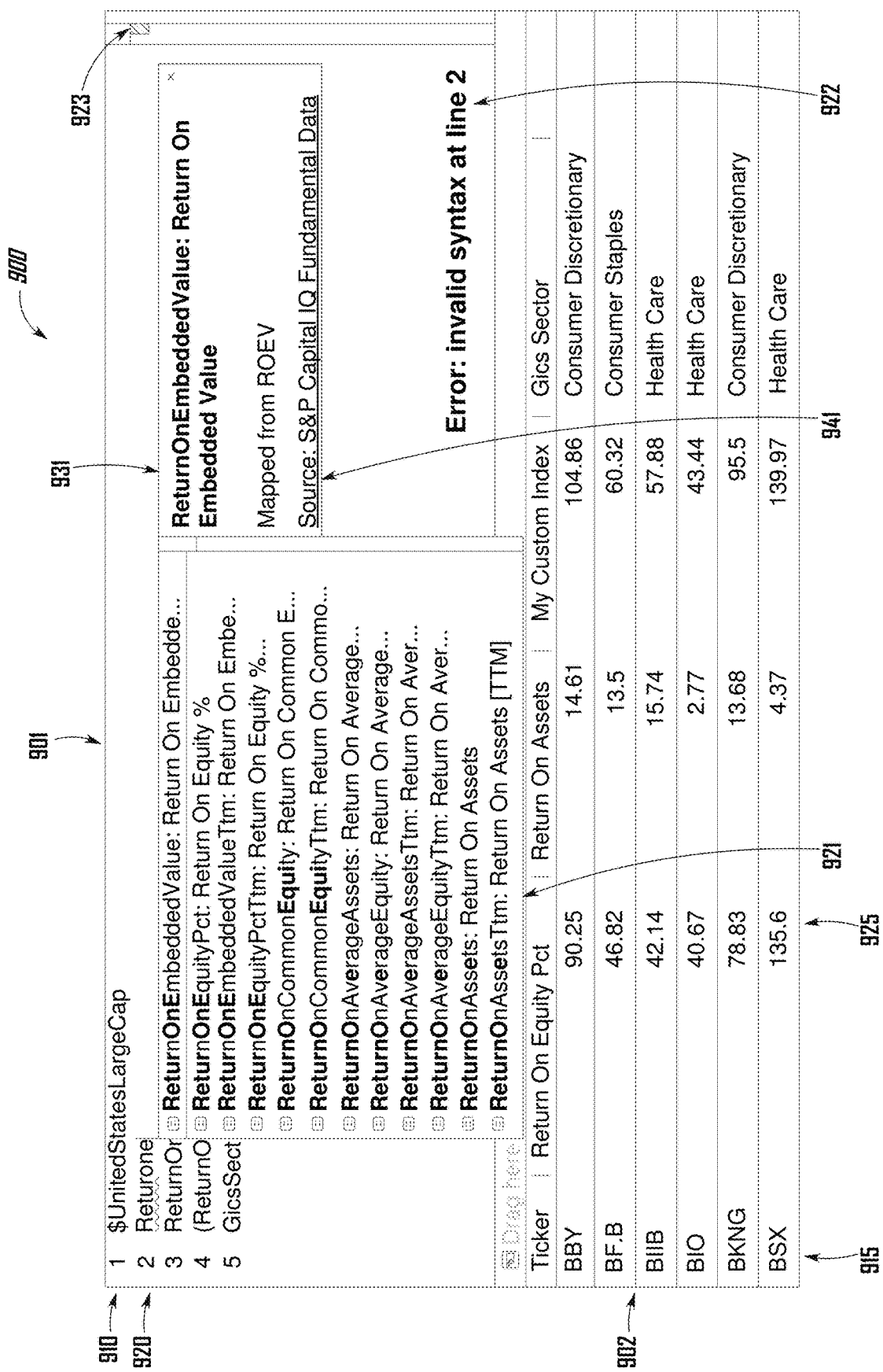
FIG. 9 illustrates an example user interface of a rapid screening system configured for equities screening, showing domain-specific syntax error handling in accordance with one embodiment.

FIG. 9 illustrates an example user interface 900 of a rapid screening system configured for equities screening, showing domain-specific syntax error handling in accordance with one embodiment. As discussed above with reference to both FIG. 2 and FIG. 5, the rapid screening system, when parsing input, is error tolerant. For example, if input is imperfect, the rapid screening system may attempt to infer an intended match in the domain-specific language and, e.g., replace the unrecognized input with the closest valid match, or propose a set of potential replacements or completions of the unrecognized input. In addition, a malformed input (e.g., a syntax error such as a symbol that does not match any operator or data tag in the domain-specific language) will not crash the rapid screening system or bring processing to a halt. In various embodiments, the rapid screening system continues to parse the remainder of the input (both preceding and following the error) and to process the parser-recognized symbols, and can continue to display previously successful results.

In the illustrated example 900, the user has entered a typographical error or incomplete input 920 "Returone" in line 2 of the multiline editor 901, e.g., after previously having entered the valid data tag "ReturnOnEquityPct". The rapid screening system displays a data tag suggestion pane 921 and explanatory text window 931 at the cursor, highlighting matching letters of likely intended input data tags and describing a selected data tag. The explanatory text window 931 includes a hyperlinked indication of a source 941 for the described data tag. At the same time, the multiline editor 901 displays a text warning 922 noting an "Error: invalid syntax at line 2" (or, e.g., "Error: data tag does not exist at line 2"), and a margin text decoration 923 as well as a red squiggly underline to highlight the location of the unrecognized and unprocessed input 920. In some embodiments, error handling includes applying information specific to the domain, such that an error message is domain specific.

Meanwhile, the rest of the grid view 902 is unaffected; the universe of U.S. large-cap stocks 915 remains displayed along with the data tags in the rest of the multiline editor 901 and the corresponding data values for the identifiers displayed. In some embodiments, previously displayed data (e.g., "Return On Equity Pct" column 925) remains shown until input that the rapid screening system can process is entered in its place; in some embodiments, no data is displayed for a symbol that the rapid screening system is unable to process.

Figure 10:
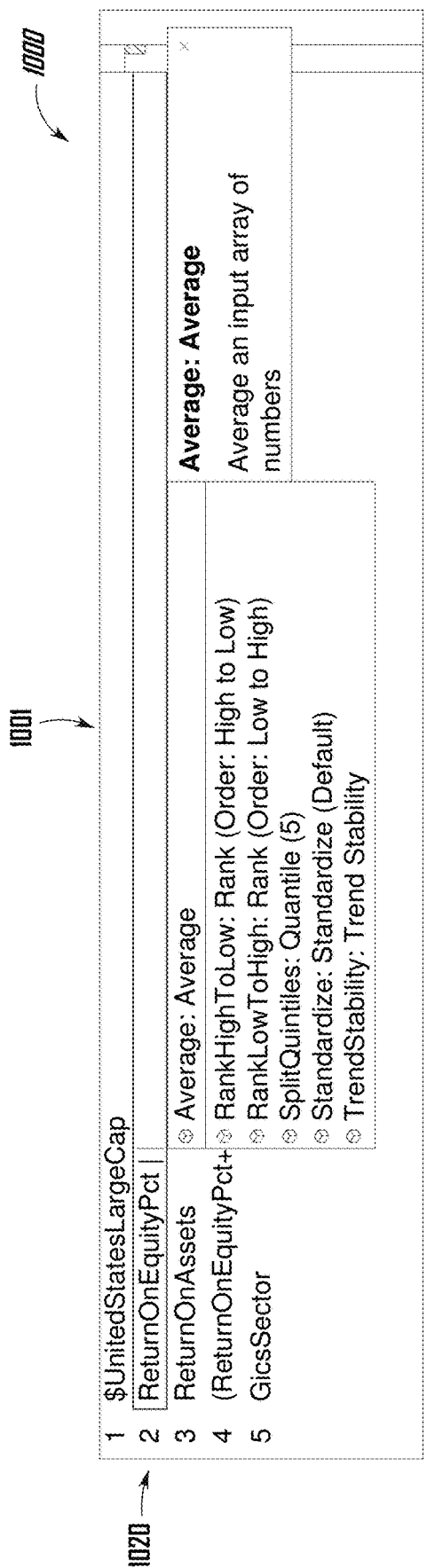
FIG. 10 illustrates an example user interface of a rapid screening system configured for equities screening, showing transformation functions in accordance with one embodiment.

FIG. 10 illustrates an example user interface 1000 of a rapid screening system configured for equities screening, showing transformation functions in accordance with one embodiment. In the illustrated example, a pipe symbol ("|") in the input 1020 in line 2 of the multiline editor 1001 signifies a transformation function or operation. In this example, five transformation functions are listed in an operator suggestion pane and explanatory text window 1021:

average (as applied to an array of numbers, produces, e.g., an arithmetic mean);

rank (compares a data value for each identifier and ranks them, either high-to-low or low-to high);

quintile (compares a data value for each identifier and sorts them into five buckets, 20% in each, and produces quintile numbers);

standardize (compares a data value for each identifier against a standardized normal distribution, and produces z-scores); and trend stability (as applied to an array of numbers, produces a number indicating whether the trend is positive, negative, or neither).

In various embodiments, a rapid screening system may provide additional or different transformation functions (e.g., a median function, a decile function, etc.). For example, a set of natural language processing transformation functions allows a user to enter an expression such as "NewsRecent["lawsuit" ] Sentiment=>LawsuitNewsSentiment" to gauge the tenor of news coverage regarding a company engaged in litigation.

Figure 11:
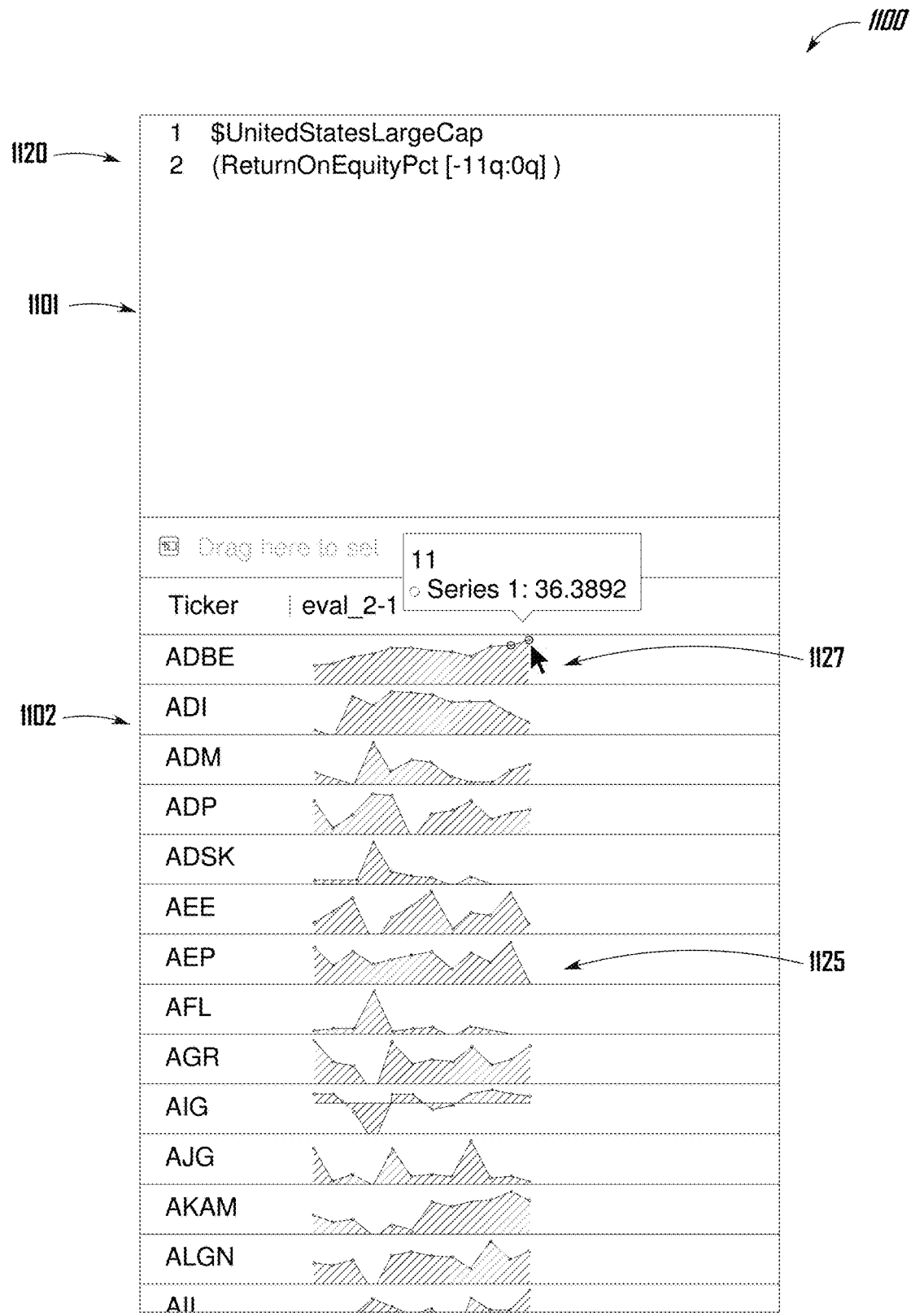
FIG. 11 illustrates an example user interface of a rapid screening system configured for equities screening, showing automatic graph display of array data in accordance with one embodiment.

FIG. 11 illustrates an example user interface 1100 of a rapid screening system configured for equities screening, showing automatic graph display of array data in accordance with one embodiment. In the illustrated example, the input 1120 on line 2 of the multiline editor 1101 is "ReturnOnEquityPct[−11q:0q]", a data tag representing each company's return on equity percentage for each of the last 12 quarters (i.e., from 11 quarters ago until the present). In some embodiments, expressions regarding a data tag associated with an array of values does not require explicit array notation, except to display a selected subset of array data. For example, two data tags representing array values could be added together or otherwise manipulated in an expression. In some embodiments, alternative or shorthand notation such as "ReturnOnEquityPct[12q]" can compactly indicate a number of periods (e.g., years, quarters, months, weeks, or days) up to the present. In some embodiments, the system automatically aligns array data. For example, if a data tag that references timeseries A is divided by a data tag that references timeseries B, the system can automatically align the current values by forward-filling.

In this example, the disclosed rapid screening system displays the array data as user-friendly compact graphs 1125, one for each identifier (with a stock ticker symbol actually displayed). The compact graphs produced by the rapid screening system include shading above or below the horizontal axis for each data value in the result array. The rapid screening system thus makes positive and negative values visually apparent and makes it easy for a user to discern trends over time. In addition, a user action in one of the compact graphs 1125 such as hovering over, right-clicking, or long-pressing a graph or a data point on a graph may reveal one or more of the underlying data values 1127 in the result array for an identifier. In some embodiments, the compact graphs 1125 include or display key information such as bounds or x-axis labels (e.g., dates).

In some embodiments, the rapid screening system provides similar functionality or extensibility for user-defined functions and data tags as well. For example, data tags or functions can be extensible so that a programmer can write custom code that underlies a data tag or function (e.g., for custom visualization of complex data) and make it available to non-programmers who use that data tag or function. For example, in some embodiments, naming a custom variable or data tag to end in "Score" can automatically format and color code the associated data values according to quartile, decile, rank, etc. Similarly, in some embodiments, naming a custom variable or data tag to end in "Trend" can automatically prompt the system to display any associated array data in a graph, and/or naming a custom variable or data tag to end in "Pie" can automatically prompt the system to display any associated array data in a pie chart. In some embodiments, the system can be configured to graph any array data. In various embodiments, formatting and/or color-coding results can be accomplished via any interface, even interactively. For example, in some embodiments columns may be grouped in the display to show a group heading above a set of subheadings.

FIG. 12 illustrates an example user interface 1200 of a rapid screening system configured for equities screening, showing automatic display of links to 10-K filings in accordance with one embodiment.

Similar to FIG. 11, the rapid screening system interface grid view 1202 includes a column 1225 displaying compact graphs representing arrays of data values that correspond to a data tag in the input 1220 in line 2 of the multiline editor 1201. In this case, the input 1220 is "ReturnOnEquityPct[−3q:0q]", a data tag representing each company's return on equity percentage for each of the last four quarters (i.e., from 3 quarters ago until the present). The same input 1220 generates a "trend stability" transformation of the array data values, giving a numerical indicator 1245 of the trend in each case. As illustrated, the trends are all upward because the input 1240 in line 4 limits the displayed identifiers to those in which the return on equity trend over the past 4 quarters is strongly positive (greater than 0.8). Line 3 is blank 1230, illustrating the ability of the multiline editor 1201 in the illustrated embodiment to seamlessly parse discontinuous input.

Another way to apply the disclosed technology to identify a positive stability trend is to compare stability trends over two time periods. For example, the following expressions establish a custom data tag named "RoeStabilityPrevious" that represents trend stability for a return on equity percentage from a year ago until four months ago, and a custom data tag named "RoeStabilityRecent" that represents trend stability for a return on equity percentage from four months ago until today:

(ReturnOnEquityPct[−11q:−4q])
|TrendStability=>RoeStabilityPrevious (ReturnOnEquityPct[−3q:0q])
|TrendStability=>RoeStabilityRecent By subtracting one trend from the other, a difference can be determined, and filtered on, e.g.:

(RoeStabilityRecent−RoeStabilityPrevious)=>RoeTrendDifference~

RoeTrendDifference >1

Or, in the alternative, absolute values of the prior and current trends can be filtered on, e.g., to identify companies whose ROE recently spiked upward:

RoeStabilityRecent >0.6
RoeStabilityPrevious <0.6

Input 1250 in line 5 of the multiline editor 1201 adds the data tag "Filings10k" to the grid view 1202, displaying information about each company's latest Form 10-K filing with the U.S. Securities and Exchange Commission (SEC). In the illustrated embodiment, the 10-K filing information includes the date of the most recent available filing, and a hyperlink to a copy of the filing online at the SEC, so that the screener can read or download the document directly. Thus, the rapid screening system can be configured to process complex data types, e.g., data and metadata in JSON format, so that the result can be displayed in a user-accessible format, for presenting a greater amount of useful information to a screener than was previously possible.

Input 1260 in line 6 of the multiline editor 1201 adds the data tag "GicsSector" to the grid view 1202, displaying the GICS sector for each of the displayed identifiers (stock ticker symbols).

Figure 13:
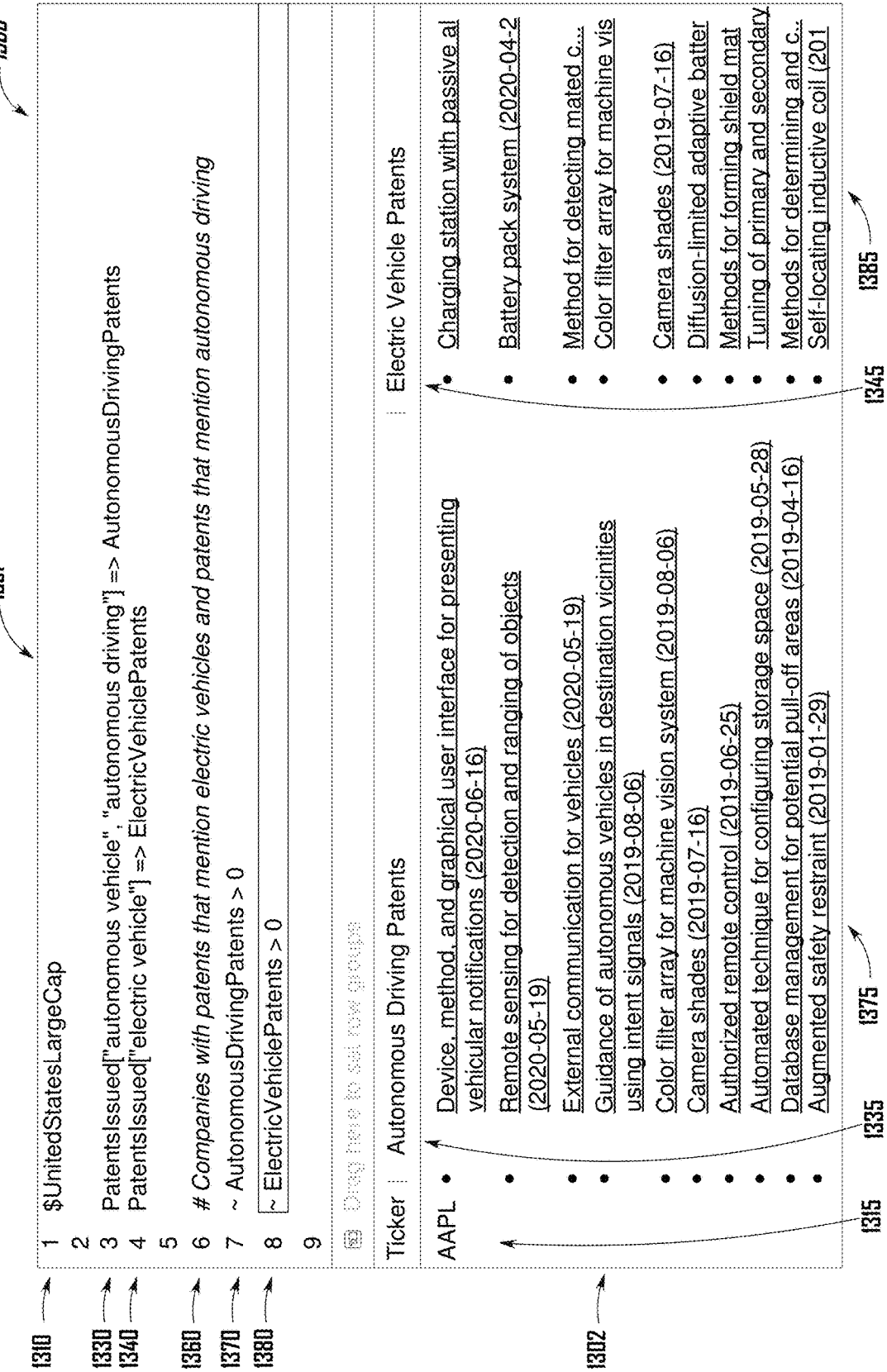
FIG. 13 illustrates an example user interface of a rapid screening system configured for equities screening, showing selective display of companies holding patents in accordance with one embodiment.

FIG. 13 illustrates an example user interface 1300 of a rapid screening system configured for equities screening, showing selective display of companies holding patents in accordance with one embodiment. In the multiline editor 1301, input 1330 in line 3 and input 1340 in line 4 use the data tag "PatentsIssued" to identify companies that have been awarded one or more patents. The rapid screening system can, for example, search a database of issued patents and identify patents whose owner or assignee matches the name of a company (accommodating non-exact matches and/or related entities in some implementations). In the illustrated example, in input 1330, the expression "PatentsIssued["autonomous vehicle", "autonomous driving" ]" is interpreted to identify companies that have been awarded one or more patents that contain either the phrase "autonomous vehicle" or the phrase "autonomous driving" (which are assigned the data tag AutonomousDrivingPatents). Similarly, the expression "PatentsIssued["electric vehicle" ]" in input 1340 is interpreted by the rapid screening system to identify companies that have been awarded one or more patents that contain the phrase "electric vehicle" (which are assigned the data tag ElectricVehiclePatents).

In the grid view 1302, column 1335 displays autonomous driving patents, and column 1345 displays electric vehicle patents, showing patent titles and issue dates and providing links to the patent documents. In some embodiments, the rapid screening system provides a total number of patents (or currently valid patents) found by the search. For example, a pure-play patent score for electric vehicles could be expressed as "PatentsIssuedCount["Electric Vehicles" ]/PatentsIssuedCount" or a similar expression. In the illustrated example, input 1370 in line 7 of the multiline editor 1301 shows filtering with the expression "~AutonomousDrivingPatents>0" and input 1380 in line 8 filters with the expression "~ElectricVehiclePatents >0" so that the only companies included in the grid view 1302 (as listed in the company ticker column 1315) are those that have at least one patent in each category. In other words (e.g., comment 1360), the displayed companies have both autonomous driving patents 1375 and electric vehicle patents 1385 (though not necessarily any autonomous electric vehicle patents).

In various embodiments, the rapid screening system can be configured to obtain, link to, and filter on the content of a wide range of data sources. For example, a "NewsRecent" data tag can cause the grid view 1202 to display recent news headlines about each company from a variety of news sources. Like the Form 10-K links of FIG. 12 and the patent titles of FIG. 13, each news headline about a given identifier is linked to the full article, while usefully providing summary information directly in the search results. In some embodiments, the system allows a user to filter on recent news articles that contain a term of interest. For example, an expression such as "NewsRecent["autonomous driving" ]" could allow the user to identify companies with few published patents in a field compared their media engagement in that field, or vice versa. In this way the rapid screening system enables a screener to directly observe active areas of a company's technology development or read news about targets of interest and obtain a subjective impression of coverage regarding such targets to supplement numeric data analysis, or identify breaking news that may move markets related to some securities.

Figure 14:
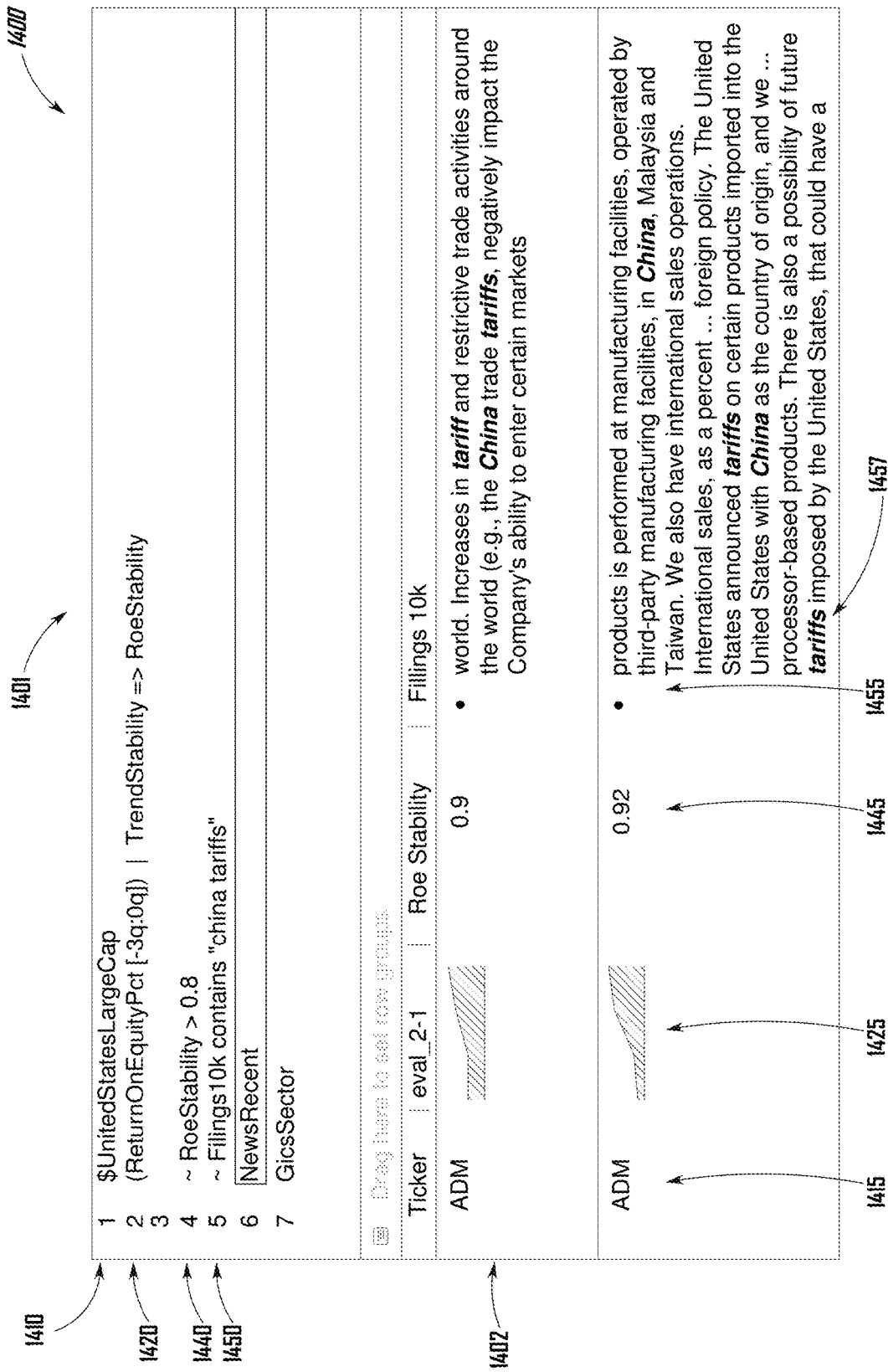
FIG. 14 illustrates an example user interface of a rapid screening system configured for equities screening, showing filtering on text found in 10-K filings in accordance with one embodiment.

FIG. 14 illustrates an example user interface 1400 of a rapid screening system configured for equities screening, showing filtering on text found in 10-K filings in accordance with one embodiment. Similar to FIG. 12, the rapid screening system in FIG. 14 includes compact trend graphs and the data tag "Filings10k". However, rather than providing links to Form 10-K filings, FIG. 14 uses that data tag to filter identifiers based on the content of their 10-K filings. In particular, input 1450 in line 5 of the multiline editor 1401 in the illustrated example shows filtering with the expression "~ Filings10k contains "china tariffs"". Accordingly, the list of companies 1415 in the results grid view 1402 is limited based on multiple criteria: U.S. large-cap companies 1410 whose ROE over the previous four quarters 1420, 1425 has grown strongly 1440, 1445, and whose last Form 10-K filing mentioned China and tariffs 1450, 1455.

In the grid view 1402, the "Filings 10k" column 1455, rather than merely providing a link to the entire Form 10-K document, displays relevant matching text from the 10-K, with the matching search terms highlighted 1457. In some embodiments, the highlighted text 1457 provides a link to the source document, or more specifically to the quoted portion of the source document.

As described above, in some embodiments, an operator like 'contains' is implemented without alphabetic text. For example, using bracket notation, the syntax could be "Filings10k["china tariffs" ]" as an equivalent example, similar to the "PatentsIssued["electric vehicle" ]" example in FIG. 13. In some embodiments, the 'contains' operator functions as a transformation, e.g., "Filings10k|contains "china tariffs"", making that step explicit and allowing filtering on the results; the filtering itself may be implicit. By providing the ability to filter identifiers based on the content of documents such as Form 10-K filings or patents, the disclosed rapid screening system allows a powerful new approach to screening and provides the ability to synthesize across disparate datasets.

Figure 15:
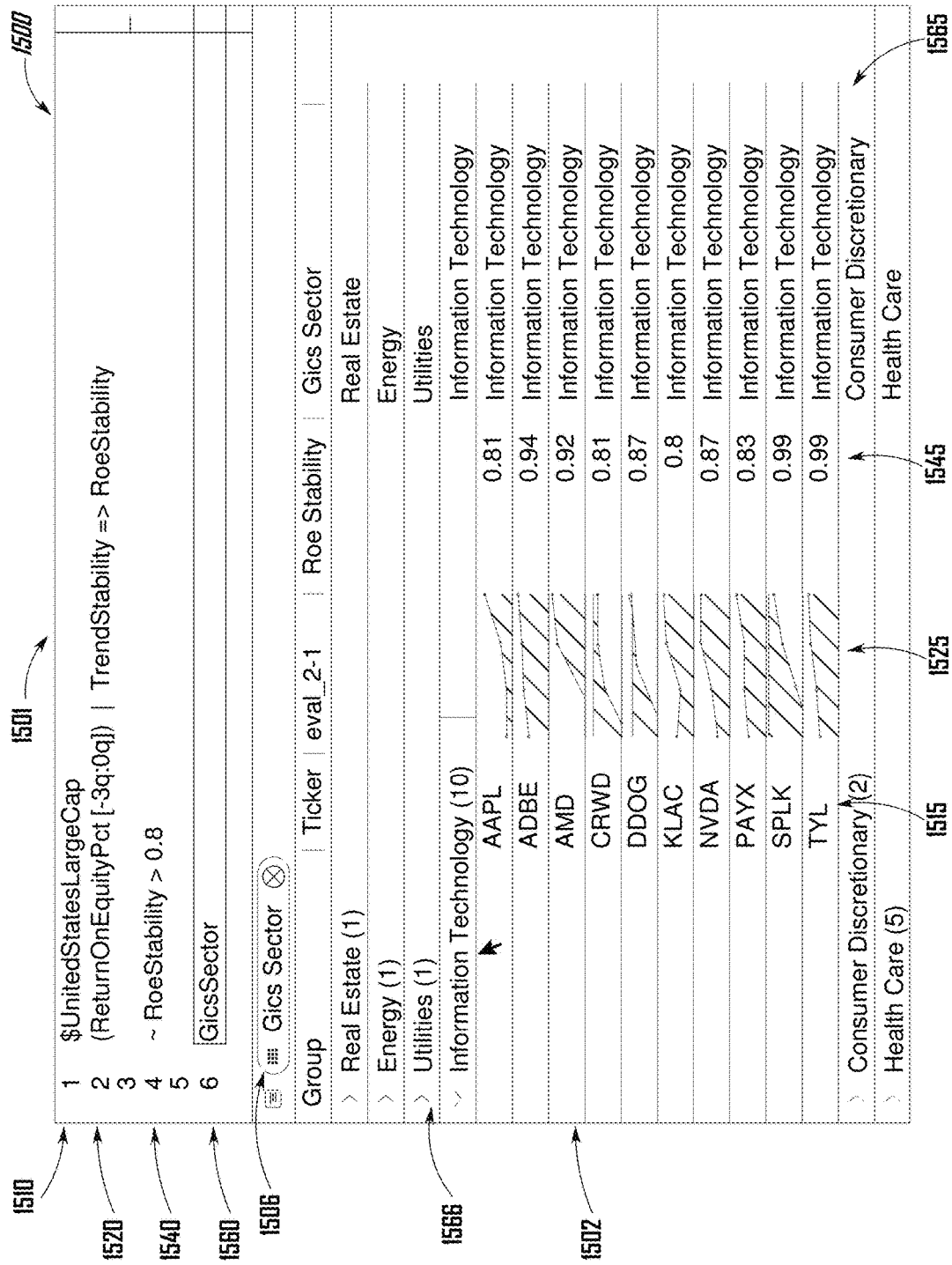
FIG. 15 illustrates an example user interface of a rapid screening system configured for equities screening, showing grouping of results in accordance with one embodiment.

FIG. 15 illustrates an example user interface 1500 of a rapid screening system configured for equities screening, showing grouping of results in accordance with one embodiment. Similar to FIG. 12, the rapid screening system in FIG. 15 includes the data tag "GicsSector" in input 1560 in line 6 of the multiline editor 1501. Accordingly, the results grid view 1502 displays the GICS sector for each of the displayed identifiers (stock ticker symbols). In FIG. 15, however, the "Gics Sector" column 1565 heading is used to group identifiers according to their category data values.

In the illustrated embodiment, the "Gics Sector" heading is also displayed 1506 as setting row groups at the top of the grid view 1502. Thus, the left side of the grid view 1502 lists a series of GICS sector categories 1566. Each category can be expanded to show the identifiers of companies in that sector or collapsed to show the number of companies in that sector that meet the active universe filtering criteria. In this example, a criterion of recent strong ROE growth among U.S. large-cap companies has produced a list of mostly information technology stocks. These interface features of the disclosed rapid screening system allow screeners to identify trends, explore strategies for identifying targets of interest, and easily see the impact of trying alternative strategies.

As demonstrated in each of the illustrations above, the flexible customizability, ease of use, rapid feedback, and power of the disclosed rapid screening system allows, e.g., complex, expressive screening ("all companies with increasing and stable return on equity (RoE) over the last three years"); unique perspectives ("all companies that mention China tariffs in their last 10-K"); identification of discontinuities or dissonances in data ("all companies with increasing brand sentiment, but flat stock price"); discovery of aggregate trends ("sectors with increasing sentiment in their earnings calls Q&A"); and benchmarking ("how does MSFT perform against all the screens we've constructed?"). Notably, screens can be composable, so a user can reference one screen from another screen, or "unit test" a company across multiple screens. This makes it easy to construct a mosaic of perspectives. The systems and methods of the present disclosure provide flexible, structured perspectives that were not previously available.

FIGS. 16A-16B illustrate an example formula 1600A for a prior art system and corresponding example expressions 1600B for a rapid screening system configured for equities screening, showing improved ease of use in accordance with one embodiment.

Figure 17A:
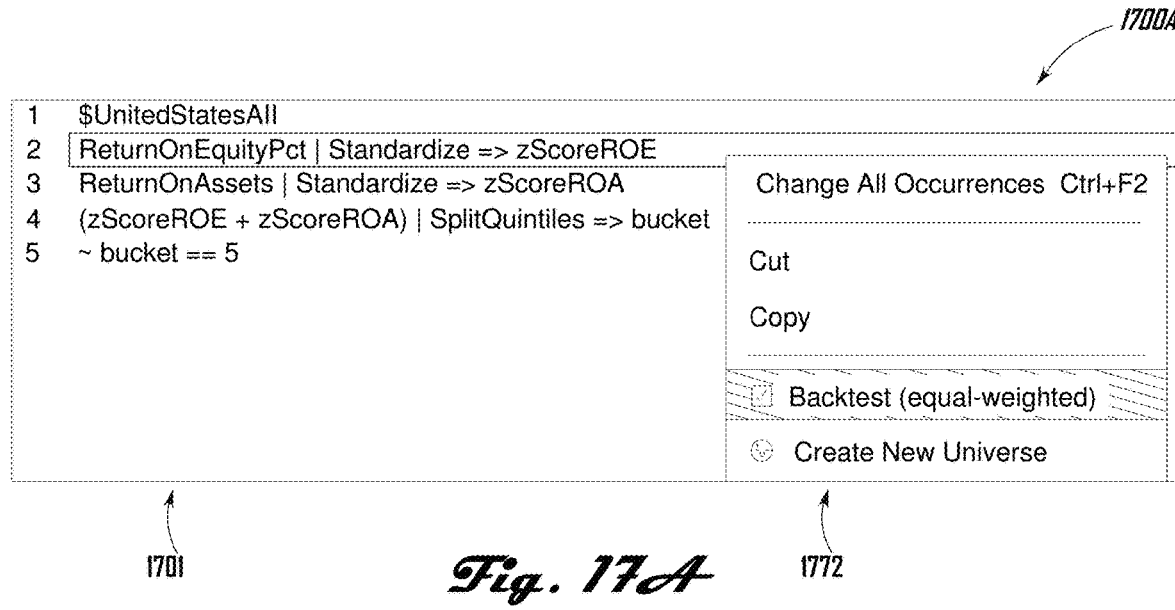
FIGS. 17A-17B illustrate an example user interface of a rapid screening system configured for equities screening, showing backtesting in accordance with one embodiment.
Figure 17B:
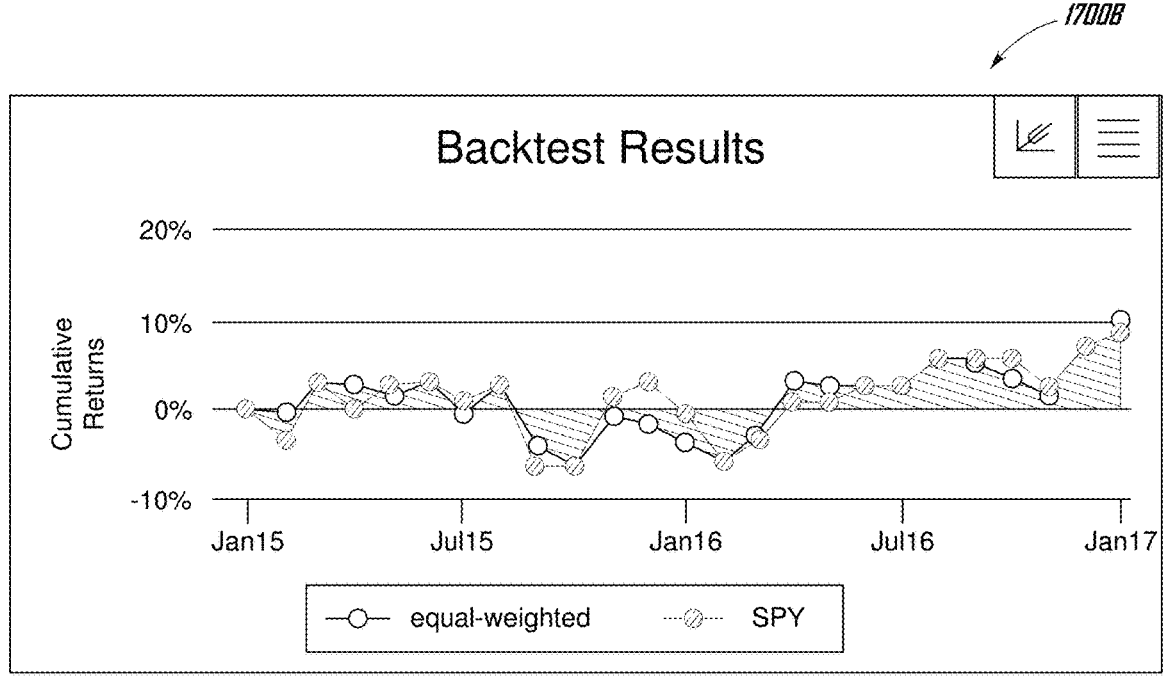

FIGS. 17A-17B illustrate an example user interface 1700A-1700B of a rapid screening system configured for equities screening, showing backtesting in accordance with one embodiment. In FIG. 17A, a highlighted selection in a contextual menu 1772 in the multiline editor 1701 provides the user the ability to "Backtest" the performance of a set of criteria against past market results.

Backtesting refers to testing a model-such as a set of screening criteria to identify stocks worth purchasing at any given time-on historical data. By applying the same criteria to past data, a screener can determine whether a strategy would have worked at another time, when different stock ticker identifiers might have met the data tag criteria being tested. Backtesting allows the user to determine how well a set of criteria, if used consistently during a past period, would have performed. The backtester creates hypothetical positions according to the user's chosen criteria, executes the user's strategy over time, and records the results. Before the present disclosure, backtesting was typically expensive and slow—hours or weeks—and limited to a narrow set of data. The disclosed rapid screening system technology takes approximately a fraction of a second to five to ten seconds to produce the backtest results 1700B and can backtest strategies expressed using the full vocabulary of the domain-specific language, without requiring significant configuration or use of a separate tool. An example concurrent server interaction for backtesting is described in greater detail below with reference to FIG. 28. In some embodiments, backtesting is implemented using a subset of the same code as the system uses for screening, which is made possible by the domain-specific context.

FIG. 17B shows a set of backtesting results 1700B for the criteria shown in the multiline editor 1701 of FIG. 17A. The illustrated backtest is equal-weighted; in some embodiments, the rapid screening system is configured to optionally run factor-weighted backtests (rather than just equal weighted), such as by selecting (e.g., right-clicking on) a factor to weight on and then choosing to backtest. In various embodiments, the backtesting results 1700B include report generation including various approaches to charting and listing the results of the backtest. For example, the backtest can provide statistics for how investments chosen according to the selected screening criteria would have performed over the selected period, and/or accounting for returns over time) in comparison to one or more benchmarks. The disclosed technology provides unprecedented accessibility to execution of concurrent programming, which users simply could not take advantage of with conventional technology.

Figure 18:
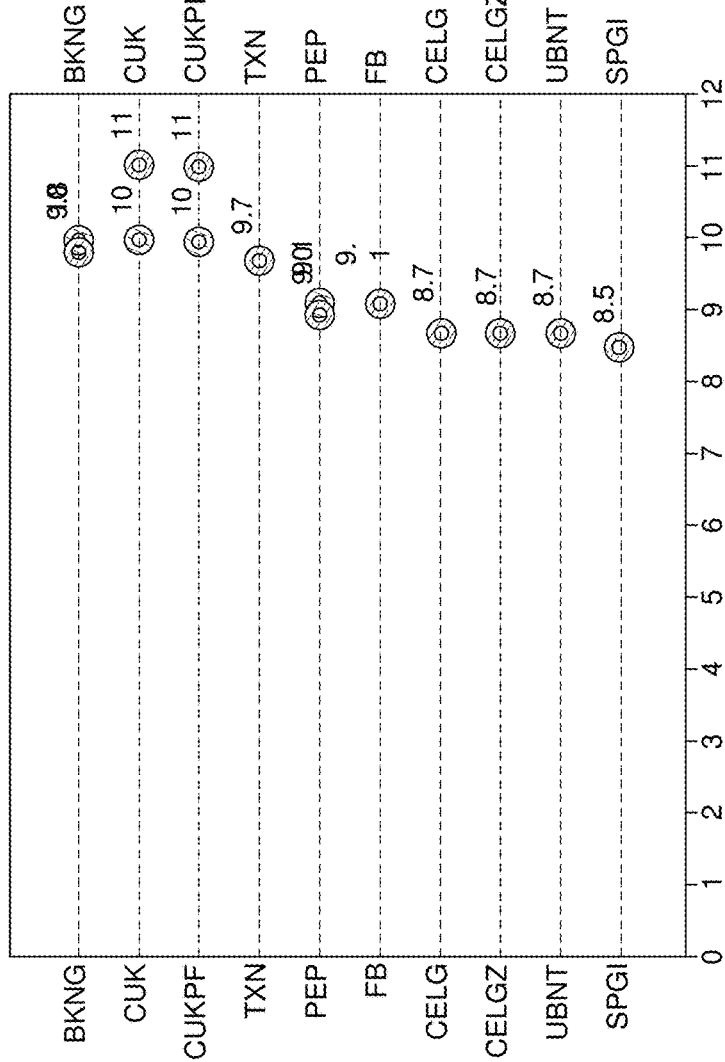
FIG. 18 illustrates an example change alert graph of a rapid screening system configured for equities screening, in accordance with one embodiment.

FIG. 18 illustrates an example change alert graph 1800 of a rapid screening system configured for equities screening, in accordance with one embodiment. In some embodiments, the rapid screening system may be configured to execute an automated daily screen and send the results to a user, e.g., via email. For example, if there are any important changes (e.g. companies added or removed from the list, new sources of risk, relevant news stories, etc.), the rapid screening system can automatically highlight that to save the user time and reduce availability bias. In the illustrated graph 1800, a set of results of a stock screen is shown with identifiers listed vertically and a numeric horizontal axis. The change alert graph 1800 provides a visualization for changes between values for yesterday (blue circles) and today (orange circles), allowing the viewer to immediately see what has changed and by how much.

In some embodiments, the technology provides the ability for a user to generate a similar graph comparing any two screening results sets.

FIG. 19A illustrates an example AI feature 1900 for introspection in a rapid screening system configured for equities screening, in accordance with one embodiment. In the illustrated example, the disclosed technology uses artificial intelligence (AI) machine learning (ML) to introspect on, and to improve, existing screening practices.

First, the factors currently used in the existing screening model (e.g., to rank potential investments) are identified. For example, a hypothetical screen, expressed in the domain-specific language of the disclosed rapid screening system, might be (0.4*ReturnOnEquity+0.4*ReturnOnAssets+
0.2*DebtToEquity)=>CustomFactor, where the existing screener sorts potential investments by the CustomFactor high-to-low to prioritize their query by what's most important to them.)

To train a black-box AI model to replicate the existing practices, we ask the question: "knowing that the inputs are ROE, ROA, and DTE, the corresponding input data, and the results, can we build a model that replicates the results of their screen?" We then train many ML models, with sample inputs being the same inputs that the existing model uses, and the existing rankings, and an output of a predicted ranking to verify that the model reflects current practice. After training the model, we can introspect on it—i.e., look inside the black box—to determine relative feature importance to that model. Introspection may determine that, e.g., a factor is superfluous or is unexpectedly heavily weighted. For example, a user may have thought that ROE and ROA were weighted equally in their screening process; but if it was possible to construct a model that predicted the output of the user's intended model by primarily using ROA, the AI feature 1900 can help the user understand how their screening process is actually working, and improve it, or offer alternative ways of getting to the same result.

One of the hardest parts in training ML models is the process of feature selection. Typically, the expert user selecting features is different from the data scientist or quant researcher who is implementing the model. The disclosed technology allows inference of a screener's feature selection parameters from the user's use of the domain-specific language in constructing the existing screens. Analyzing use of such a domain-specific language would have not been possible in any existing screener because no other screener that is similarly accessible is sufficiently expressive for the user to say what they're looking for, nor in an existing language that is not structured or constrained enough that we're able to infer semantic meaning from the user's use of the tool.

Another challenge—particularly when dealing with financial data—is overfitting. For the introspection use case, it is immaterial that the ML model produced is overfitted, because we're not actually trying to predict a future event, just analyze an existing one. By leveraging properties of overfitted models, the disclosed technology runs counter to conventional practice and teaching. Overfitting is usually considered undesirable, and would be extremely unintuitive for a person of ordinary skill in the art.

FIG. 19B illustrates an example AI feature 1950 for prediction in a rapid screening system configured for equities screening, in accordance with one embodiment. This is a different approach to improving screening with AI than the introspection ML model described above with respect to FIG. 19A. The approach in this case is to use machine learning to train a set of classifiers that take as input a universe of companies at a point in time, and a selected subset of example companies. The example companies may be a list of individual identifiers chosen individually or may be those satisfying some filtering criteria (e.g., ROE above a threshold, or company names containing "hotels"). The example companies in the subset may be "preferred" targets, companies having characteristics that the screener wishes to avoid, or some other category. Approaches to developing the ML model may include bootstrapping, random forest, AutoML, or other ML models, preferably a model where the trainer can infer relative feature weights. The trainer can exert some control over the resulting screening models, e.g., by training more models and averaging. The classifiers are trained to produce the example companies; they all achieve the same solution, but in different ways. Thus, they can predict filters that would have found those example companies. This can reveal the user's preferences by showing what data tags and weights correlate or anti-correlate. In some implementations, the result is generation of a probability distribution and feature weights.

Unlike a typical recommendation engine that is trained on one subset of a predefined set of like things, and operates on another presumed similar subset, this training model creates a layer of abstraction, describing a pocket that the user may believe they know well (e.g., selected companies in a selected industry). The model, in addition to helping to quantify that, allows the user to apply the understanding of that pocket to other pockets or universes, such as other industries, countries, and/or times.

These classifiers can either be utilized individually, or as part of an ensemble. Ensembles enable us to reduce overfitting for the predictive context. And some models enable us to introspect further into the specific weights. Other implementations include combining classifiers generated from different "runs" of this same algorithm. The resultant prediction module (a combination of classifiers) can be applied in a number of different ways, or can enable a user to adjust or iterate with the machine on feature weights, for instance.

Figure 20:
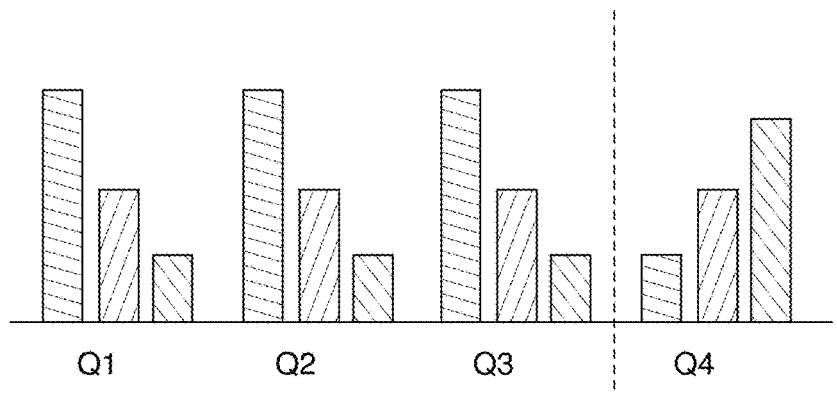
FIG. 20 illustrates an example AI feature for regime change detection in a rapid screening system configured for equities screening, in accordance with one embodiment.

FIG. 20 illustrates an example AI feature 2000 for regime change detection in a rapid screening system configured for equities screening, in accordance with one embodiment. In finance, a regime change is associated with an abrupt change in the behavior of financial markets, such as may be associated with cycles of economic activity changing between expansion and recession. Understanding regime change is important because it enables investment managers to react to systemic market changes.

A regime change model is typically defined as a time-series model in which parameters are allowed to take on different values in each of some fixed number of "regimes". Typically, a regime change model includes some set of predefined factors that they look for, and some fixed definition of a regime. Usually, significant thought goes into defining "what are the regimes" and "what are the features that influence the regimes".

Two problems with current approaches, though, are:
1. While a model can tell you about a possible regime change given our historical and pre-defined understanding of a regime, the important question for an investor to answer isn't "is the world changing?" but "is the world changing in a way that is material to this investment strategy?"
2. They require defining the input variables up front, and aren't adaptive to changes in the forces impacting the market.

We can continue to build on the AI/ML approach described above with reference to FIG. 19A to address custom regime change detection. Building on the AI of FIG. 19A, we infer and construct a custom regime change model with no explicit instructions by the investment manager. We perform the same procedure, but this time, rather than looking at one snapshot time window, we can observe many windows in sequence. So we construct a set of ML models for each time period (e.g., quarters).

Again, it is immaterial that the ML models we construct are overfitted. The output is the influence of the defined factors/features over time. If there is a change in the influence of the features that are material to your investment process, then it is an early warning signal that factors you depend on may have shifted, so you may want to consider adapting your approach.

The ability to infer regime change models from this little information doesn't currently exist. The combined expressability and semantic structure/limitations of the language, and also the application of ML, help to make that ability more powerful. The disclosed technology allows the domain expert decision maker to combine it with their own judgment and iterate together with the AI to improve the outcome.

Referring back to FIG. 19B, the predictive AI model can be applied to use intuition about a known regime in the past to infer similar choices to make in a current regime. For example, if the user believes today's regime is similar to the regime companies were experiencing in 1990, the model can be used to highlight companies similar to a subset of selected companies from 1990 (such as those that thrived in that regime). That is, a model trained to predict targets of interest in 1990 can now be applied to today. Thus, with the input of a set of names and dates, the output would be a set of similar names with a score associated to them in the present and a set of screens.

As another example, the current state of the world is commonly assessed in terms of whether "value," "growth," "quality," "momentum," etc. factor stocks are currently favored to outperform. But the user may not be sure whether, say, the quality category actually applies to that user's world 'pocket' (e.g., a limited subset of securities). To find companies that would have done well in 2007 and/or 2003, for example, would require too much data to keep in one's head; thus, a traditional investor must fall back to intuition. The AI model can essentially codify that intuition: where the idea that "this feels like a time in the past" isn't concrete, the model makes "now feels like then" concrete and quantifiable.

In addition, this AI model approach can be applied across industries, or across countries, as well as dates or asset classes (e.g., the US market in 2003, vs. China now), enabling transfer learning and generating insight regarding cross connections that might otherwise remain undiscovered.

The disclosed AI model training does not just use the past to predict the future via an un-tweakable black box; it adds a user's input of experience-based intuition about the past, quantifying a regime (defined on the fly, not categorized in advance), defining predictive models based on it, and providing rationales to identify characteristics that worked well then, and could-if the user's intuition is correct-work well now as well.

Rather than attempt to tell you what predefined regime you are in today, while providing no actionable insights (e.g., what companies you might consider buying, given that the climate is similar), this model provides recommendations of companies today that are similar to companies that would have been of interest in the past (e.g., based on their performance/returns or other qualities) in a past climate.

In some embodiments, the relevant "features" for training the model can be inferred from the code specified in the editor (e.g., by analyzing data tags—including user-defined data tags—and expressions). Normally, a data science or machine learning expert would perform this feature engineering. The disclosed technology enables a non-technical user who does not know about machine learning to effectively collaborate with a machine learning AI screening model.

This facilitates a continuous feedback loop between the user and the AI screening model, where the user can effectively perform feature engineering to improve the AI screening model by changing the text within the multiline editor. This way, the user can effectively iterate on the specified features that feed into the model and better find targets of interest.

Figure 21:
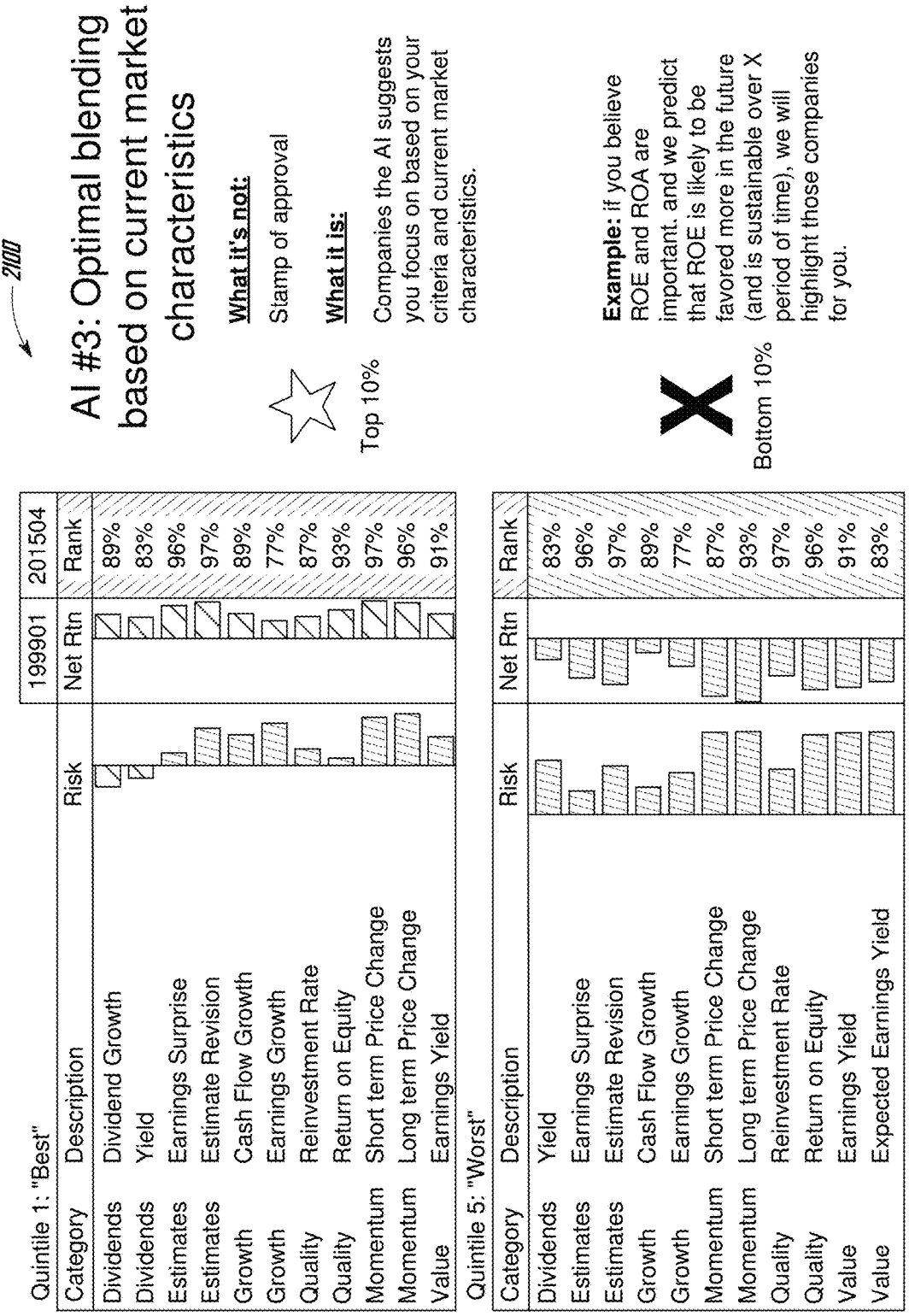
FIG. 21 illustrates an example AI feature for optimizing blending in a rapid screening system configured for equities screening, in accordance with one embodiment.

FIG. 21 illustrates an example AI feature 2100 for optimizing blending in a rapid screening system configured for equities screening, in accordance with one embodiment.

Building on the approaches disclosed above in relation to FIG. 19A and FIG. 20, we use these introspection and/or regime change insights to optimize screening models going forward. If ROE is outperforming—i.e., if the screener believes that ROE and ROA are equally important, but the ML models infer that ROE is likely to identify more companies of interest, we can highlight companies in your generated list that you might want to focus more on.

Similarly, building on the approaches disclosed above in relation to FIG. 19B and FIG. 20, a screen that models the high-performing securities in your portfolio can be applied to identify additional screening criteria and/or weightings by finding a set of screens to generate the names of those securities.

In a variation of the above approach, the predictive AI model can also be applied to obtain herding and/or minimal consensus risk assessment for names in a screen. Given the input of a screen and a date, the output is two lists of identifiers: the names to hit the fewest of the other screens, and the names to hit the most other screens. The first represents minimal consensus risk; the second represents herding risk.

Thus, if we generate, say, 100 screens that help you find that set of companies (i.e., if there are 100 ways to get to the same solution), then if 75 of those screens agree that MSFT is a good pick, the takeaway depends on your confidence that MSFT is the kind of company you want to buy. Is it representative of what you value? Or do you reflect and wonder how independent your viewpoint is? That is, if the screen reveals that a large majority of what you do is what traditional growth investors do and a small portion is your "secret sauce," then you gain the ability to introspect and act on that to adjust your biases, your perspective, and/or your actions.

In another variation, the predictive AI model can be used to identify near misses: ticker names, for example, that did not hit the user's original screen or names in the portfolio, but that did hit many of the AI-learned screens. Such companies might warrant action to investigate.

FIG. 22 illustrates an example AI feature 2200 for feature suggestions in a rapid screening system configured for equities screening, in accordance with one embodiment.

Building on the approaches disclosed above in relation to FIG. 19A, FIG. 20, and FIG. 21, we can suggest features (e.g., data tags) to add to a set of screening criteria, and features to remove. For example, we add one more feature that is just random noise, set that as a baseline for comparison to the influence of the other factors in the existing screening criteria, and recommend you remove features below that threshold. For instance, if DTE has less impact in our shadow models than random noise, you might think that signal is being incorporated, but in practice, it's not. Because we have a strong semantic understanding of the goal the user is trying to accomplish, we can statically and/or dynamically analyze to make suggestions that improve their strategy performance.

The disclosed AI models and interface provide a simple, yet powerful level of abstraction-because the user input is domain-specific, we have more context on the kinds of problems users are looking to solve. The user input allows inference of user preferences within the domain. The interface is non-technical and interactive, encouraging users to iterate based on their results, and easily do 'feature' engineering.

In addition, these AI models provide a contrast to normal quantitative modeling, where goals are typically defined very rigidly. The disclosed models enable us to target qualitative and/or hard-to-describe goals, which makes it viable and useful for discretionary investors that lean more on experience.

FIG. 23 illustrates an example user interface of a rapid screening system configured for equities screening, showing creative uses of operators in accordance with one embodiment. In the multiline editor 2301, the line 3 input 2330 applies a transformation "RankHighToLow" to U.S. large capitalization companies 2310 based on their current return on assets, and assigns the ranking metadata to the variable "RoaRank" 2335. The line 6 expression 2360 incorporates a ternary operator, emoji characters, and string concatenation to produce an easy-to-read Roa Indicator column 2365. The ternary operator functions like a short-form if-then statement formatted as "(X?Y:Z)" where if the expression X is true, the output of the ternary operator is Y, and if not, the output is Z. Thus, for any company whose Roa Rank is 75 or better, the result is a green checked box emoji character, and for any company whose Roa Rank is 76 or worse, the result is a red X mark emoji character, as noted in comment 2350, which begins with a hash character (#). The output emoji character is concatenated with a space character and the return on assets value, displaying the Roa Indicator column 2365 highlighting the stocks with the highest ROA among U.S. large cap equities.

Figure 24:
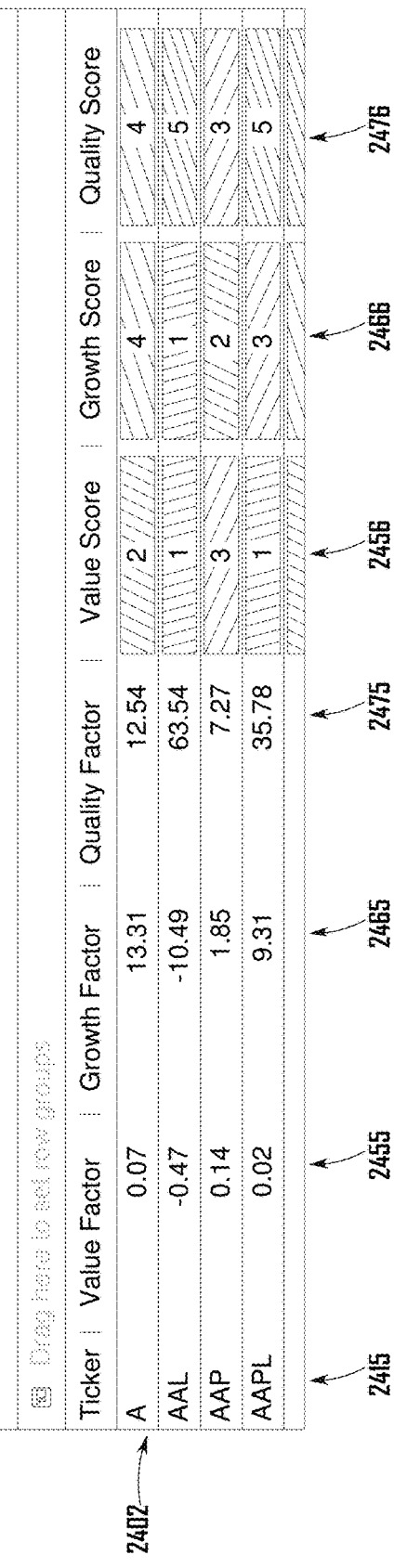
FIG. 24 illustrates an example user interface of a rapid screening system configured for equities screening, showing automatic formatting in accordance with one embodiment.

FIG. 24 illustrates an example user interface 2400 of a rapid screening system configured for equities screening, showing automatic formatting in accordance with one embodiment. In the illustrated example, applied to a universe of U.S. large cap stocks 2410, three calculations determine a "value" factor 2450/2455, a "growth" factor 2460/2465, and a "quality" factor 2470/2475. In lines 10, 11, and 12, the three factors each have a "SplitQuintiles" transformation applied 2451, 2461, 2471, generating metadata assigning a 1-to-5 quintile scale to the factor scores for each identifier. (Meanwhile, nothing is displayed in the grid view 2402 for comments 2420, 2430, and 2490 that begin with a hash (#) character.)

The quintile scoring for each factor is assigned to a variable or custom data tag named ending in "Score." As a result, the rapid screening system treats the values associated with those variables specially, by displaying them in the grid view 2402 with a "heatmap" color coding. As illustrated, the "1" quintile scores are shown in cells colored dark red; the "2" quintile scores are shown in cells colored deep orange; the "3" quintile scores are shown in cells colored yellow; the "4" quintile scores are shown in cells colored light green; and the "5" quintile scores are shown in cells colored dark green.

This and other automated formatting of displayed values provides a contrast to conventional screening systems and makes the displayed results easy for an untrained user to understand while providing greater flexibility and expressiveness.

FIG. 25 illustrates an example user interface 2500 of a rapid screening system configured for equities screening, showing a point-in-time situation report of forecasts in accordance with one embodiment. The time series situation report model provides not just exploration and screening abilities, but insights and powerful analytics leveraging analysts' forecasts over time, and comparing them to companies' actual performance.

In the illustrated example, in the multi-line editor interface 2501, in line 1 2510, the notation "#/Model/Situation-Report" invokes the Situation Report mode or model (many other equivalent approaches such as a button, dropdown menu, voice command, etc. can also be used). Some controls are not shown, including an input field for entering a list of companies or a universe identifier (in this case, the five companies shown in the "Company Name" column 2515) and a date field with a calendar drop-down. The multi-line editor interface 2501 includes a set of data tags representing analysts' expectations in several areas, such as "EbitConsensusMean" 2530. That data tag reflects the consensus average of analysts' predictions of a company's earnings before interest and taxes.

The contents of each cell in the Situation Report model are not simple values, but are each a summary of a complex set of data. To generate the summary Situation Report, the rapid screening system spawns a computing process for each cell in the grid display 2502, to download and process the underlying information. The data are interpolated and smoothed, then displayed. The values displayed represent a current (for the selected calendar date) forecast rate of change of the selected metric for the selected company. For example, in the illustrated example, for Bed Bath & Beyond Inc. 2531, the value for Ebit Consensus Mean 2535 is 53 2545. That indicates a slight positive slope for the consensus mean, implying that the forecast is for EBIT to remain flat or increase very slightly.

In the illustrated example, the cells are hued along a red-yellow-green spectrum (based on standard deviations, for matching human eye/expectations) based on a curve slope of the smoothed forecast. Thus, values between 0 and 10 correspond to the fastest decline, and values from 90 to 100 correspond to a fastest increase relative to a maximum absolute slope. The EBIT consensus mean 2535 for Microsoft Corporation 2532 is a very high 95 2546, and is thus shaded vivid green, indicating that the consensus forecast is for Microsoft's EBIT to increase almost as sharply as ever. As of the date of the present disclosure, the computational complexity of the illustrated analytics would make them infeasible to run on a personal computer.

In addition to displaying a current trend, the Situation Report provides controls that allow for previously unavailable navigation, synthesis, and context-awareness of analysts' forecasts. For example, by adjusting calendar dates, the user can easily run the forecasts on previous times and compare how the state of consensus predictions has changed or is changing. In addition, a green arrow 2580 or a red arrow 2585 indicates that a company's actual forecast is exceeding or not meeting a predicted consensus forecast, which may presage change. Moreover, each cell is a link to a larger graph displaying more complete information over time, as described further below with reference to FIG. 26.

Figure 26:
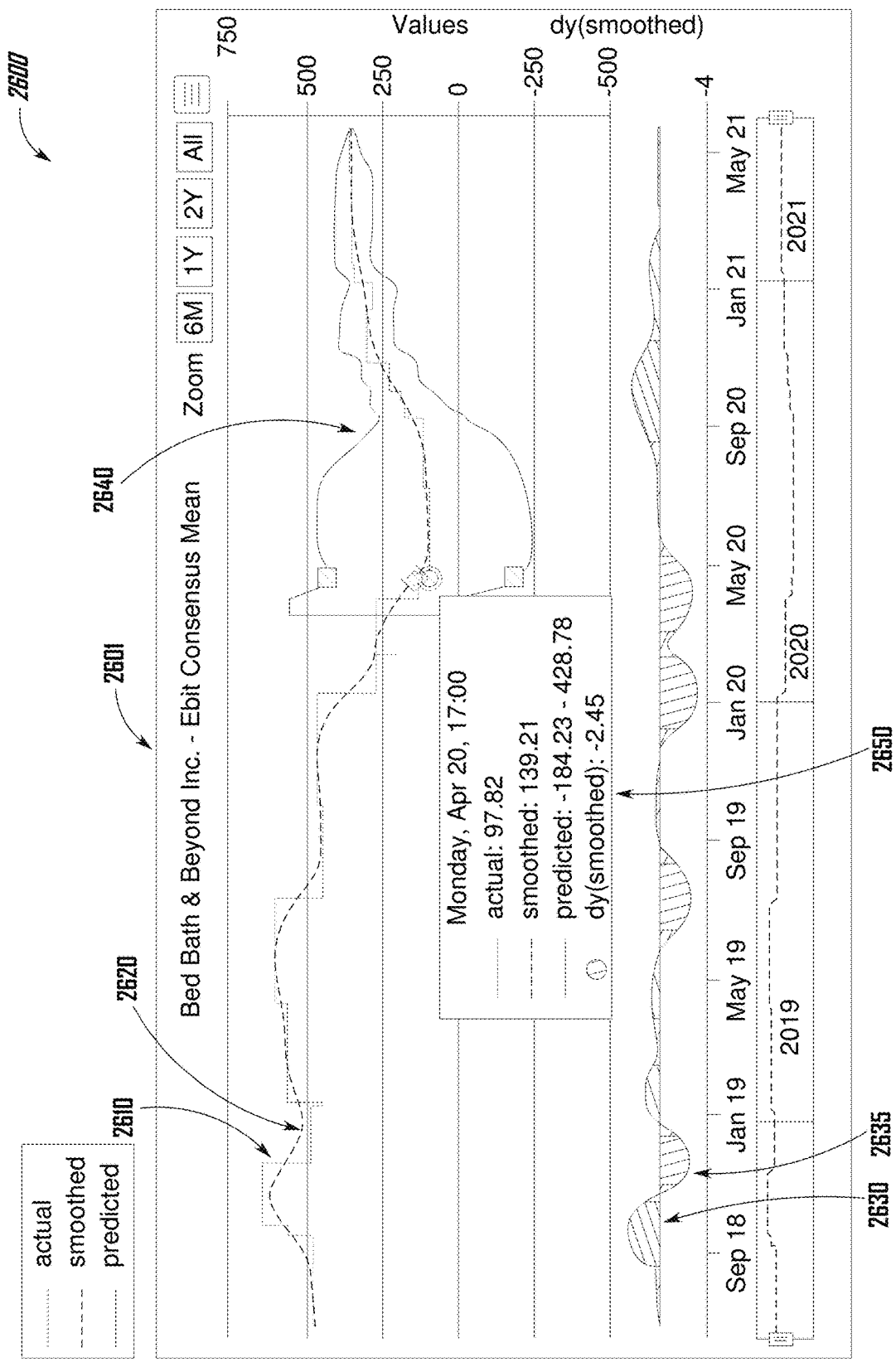
FIG. 26 illustrates an example user interface of a rapid screening system configured for equities screening, showing a situation report historical forecast graph in accordance with one embodiment.

FIG. 26 illustrates an example user interface 2600 of a rapid screening system configured for equities screening, showing a situation report historical forecast graph 2601 in accordance with one embodiment. This graph 2601 is shown when the user selects the cell 2545 from FIG. 25, and shows the detail behind the number displayed in the initial Situation Report table. The graph 2601 includes a stepped line 2610 representing actual consensus forecasts for EBIT for Bed, Bath, & Beyond over the displayed time frame. In addition, a smoothed line 2620 is shown, which is also the source of the slope calculation described above with reference to FIG. 25. Around or near the actual and smoothed forecasts is a shaded region 2640 representing a predicted interval for the analysts' forecasts. When the actual forecast 2610 goes outside the predicted interval 2640, the Situation Report table (shown in FIG. 25) marks the excursion because it may indicate a change from previously settled expectations. A legend 2650 displays the exact values for a given date.

The Situation Report graph applies to any time series data, not just estimates. As applied to the estimates in the illustrated example, it highlights large changes in analysts' forecasts that exceed predictions, and consistent movements as well. For example, a dy (smoothed) graph runs along the lower half of the chart, illustrating the rate of change of the forecasts. Thus, in the illustrated example, analysts' EBIT expectations were rising 2630 in about October 2018, and falling 2635 in about November 2019. This makes inflection points in analysts' expectations easier to identify, with no coding or other special technical expertise required from the user. This visualization of consensus forecasts reduces the learning curve and decreases the time to insight—by adding a company to the list, the user can get immediate results. Thus, the disclosed technology can make it easy for a user to see warnings, potentially even before the market reacts. Other embodiments enable a user to screen on this information in the same ways as illustrated and described above.

Figure 27:
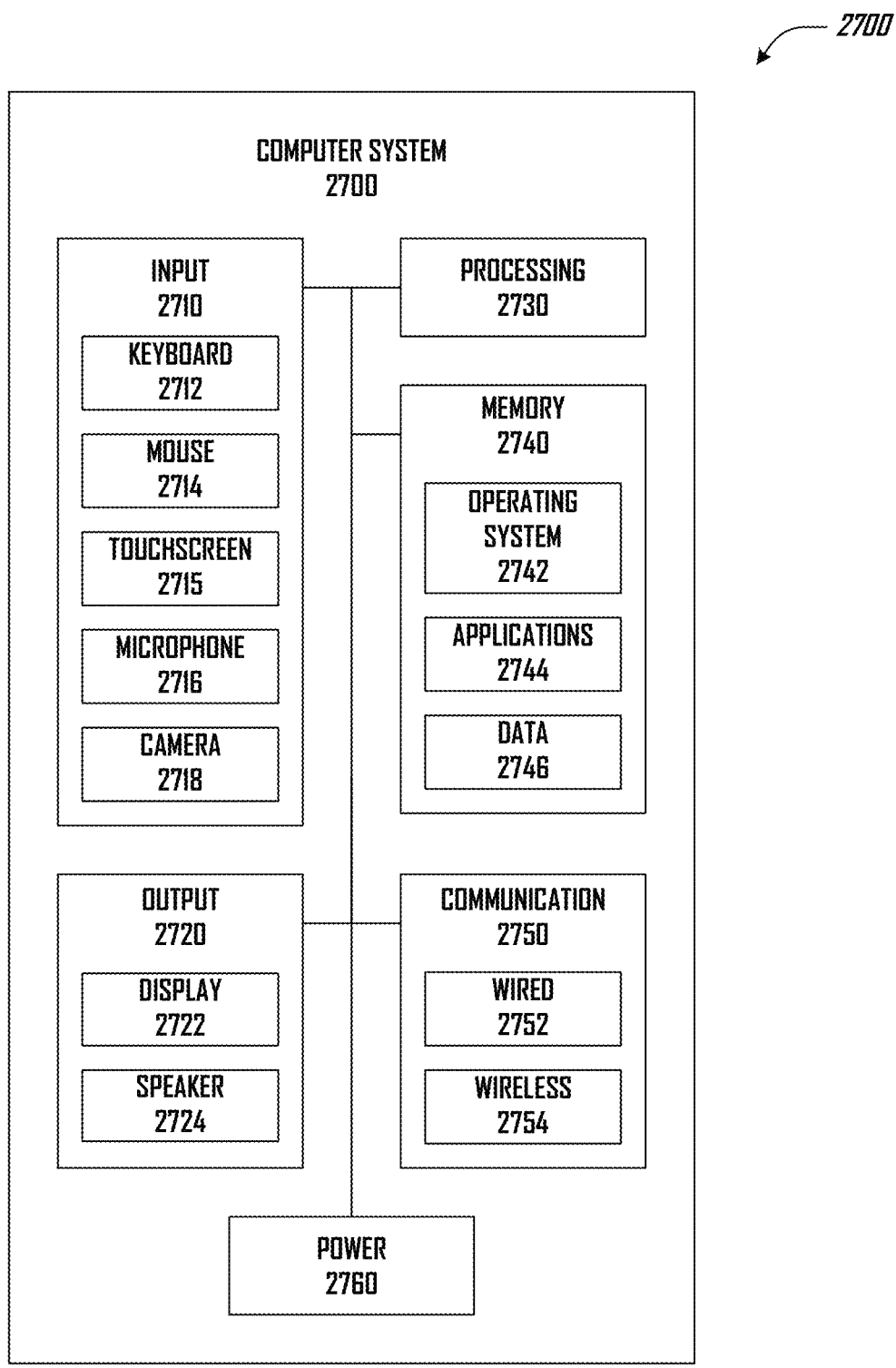
FIG. 27 is a block diagram showing some of the components typically incorporated in computing systems and other devices on which the present technology can be implemented.

FIG. 27 is a block diagram showing some of the components typically incorporated in computing systems and other devices on which the present technology can be implemented. In the illustrated embodiment, the computer system 2700 includes a processing component 2730 that controls operation of the computer system 2700 in accordance with computer-readable instructions stored in memory 2740. The processing component 2730 may be any logic processing unit, such as one or more central processing units (CPUs), graphics processing units (GPUs), digital signal processors (DSPs), field-programmable gate arrays (FPGAs), application-specific integrated circuits (ASICs), etc. The processing component 2730 may be a single processing unit or multiple processing units in an electronic device or distributed across multiple devices. Aspects of the present technology can be embodied in a special purpose computing device or data processor that is specifically programmed, configured, or constructed to perform one or more of the computer-executable instructions explained in detail herein.

Aspects of the present technology can also be practiced in distributed computing environments in which functions or modules are performed by remote processing devices that are linked through a communications network, such as a local area network (LAN), wide area network (WAN), or the Internet. In a distributed computing environment, modules can be located in both local and remote memory storage devices. In various embodiments, the computer system 2700 may comprise one or more physical and/or logical devices that collectively provide the functionalities described herein. In some embodiments, the computer system 2700 may comprise one or more replicated and/or distributed physical or logical devices. In some embodiments, the computer system 2700 may comprise one or more computing resources provisioned from a "cloud computing" provider, for example, Amazon® Elastic Compute Cloud ("Amazon EC2®"), Amazon Web Services® ("AWS®"), and/or Amazon Simple Storage Service™ ("Amazon S3™"), provided by Amazon.com, Inc. of Seattle, Washington; Google Cloud Platform™ and/or Google Cloud Storage™, provided by Google Inc. of Mountain View, California; Windows Azure®, provided by Microsoft Corporation of Redmond, Washington; and the like.

The processing component 2730 is connected to memory 2740, which can include a combination of temporary and/or permanent storage, and both read-only memory (ROM) and writable memory (e.g., random access memory or RAM, CPU registers, and on-chip cache memories), writable non-volatile memory such as flash memory or other solid-state memory, hard drives, removable media, magnetically or optically readable discs and/or tapes, nanotechnology memory, synthetic biological memory, and so forth. A memory is not a propagating signal divorced from underlying hardware; thus, a memory and a computer-readable storage medium do not refer to a transitory propagating signal per se.

The memory 2740 includes data storage that contains programs, software, and information, such as an operating system 2742, application programs 2744, and data 2746. Computer system 2700 operating systems 2742 can include, for example, Windows®, Linux®, Android™, iOS®, and/or an embedded real-time operating system. The application programs 2744 and data 2746 can include software and databases—including data structures, database records, other data tables, etc.—configured to control computer system 2700 components, process information (to, e.g., optimize program code data), communicate and exchange data and information with remote computers and other devices, etc.

The computer system 2700 can include input components 2710 that receive input from user interactions and provide input to the processor 2730, typically mediated by a hardware controller that interprets the raw signals received from the input device and communicates the information to the processor 2730 using a known communication protocol. Examples of an input component 2710 include a keyboard 2712 (with physical or virtual keys), a pointing device (such as a mouse 2714, joystick, dial, or eye tracking device), a touchscreen 2715 that detects contact events when it is touched by a user, a microphone 2716 that receives audio input, and a camera 2718 for still photograph and/or video capture. The computer system 2700 can also include various other input components 2710 such as GPS or other location determination sensors, motion sensors, wearable input devices with accelerometers (e.g., wearable glove-type input devices), biometric sensors (e.g., a fingerprint sensor), light sensors (e.g., an infrared sensor), card readers (e.g., a magnetic stripe reader or a memory card reader), and so on.

The processor 2730 can also be connected to one or more various output components 2720, e.g., directly or via a hardware controller. The output devices can include a display 2722 on which text and graphics are displayed. The display 2722 can be, for example, an LCD, LED, or OLED display screen (such as a desktop computer screen, handheld device screen, or television screen), an e-ink display, a projected display (such as a heads-up display device), and/or a display integrated with a touchscreen 2715 that serves as an input device as well as an output device that provides graphical and textual visual feedback to the user. The output devices can also include a speaker 2724 for playing audio signals, haptic feedback devices for tactile output such as vibration, etc. In some implementations, the speaker 2724 and the microphone 2716 are implemented by a combined audio input-output device.

In the illustrated embodiment, the computer system 2700 further includes one or more communication components 2750. The communication components can include, for example, a wired network connection 2752 (e.g., one or more of an Ethernet port, cable modem, Thunderbolt cable, FireWire cable, Lightning connector, universal serial bus (USB) port, etc.) and/or a wireless transceiver 2754 (e.g., one or more of a Wi-Fi transceiver; Bluetooth transceiver; near-field communication (NFC) device; wireless modem or cellular radio utilizing GSM, CDMA, 3G, 4G, and/or 5G technologies; etc.). The communication components 2750 are suitable for communication between the computer system 2700 and other local and/or remote computing devices, directly via a wired or wireless peer-to-peer connection and/or indirectly via a communication link and networking hardware, such as switches, routers, repeaters, electrical cables and optical fibers, light emitters and receivers, radio transmitters and receivers, and the like (which can include the Internet, a public or private intranet, a local or extended Wi-Fi network, cell towers, the plain old telephone system (POTS), etc.). The computer system 2700 further includes power 2760, which can include battery power and/or facility power for operation of the various electrical components associated with the computer system 2700.

Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like. While computer systems configured as described above are typically used to support the operation of the technology, one of ordinary skill in the art will appreciate that the technology may be implemented using devices of various types and configurations, and having various components. It is not necessary to show such infrastructure and implementation details to describe an illustrative embodiment.

Figure 28:
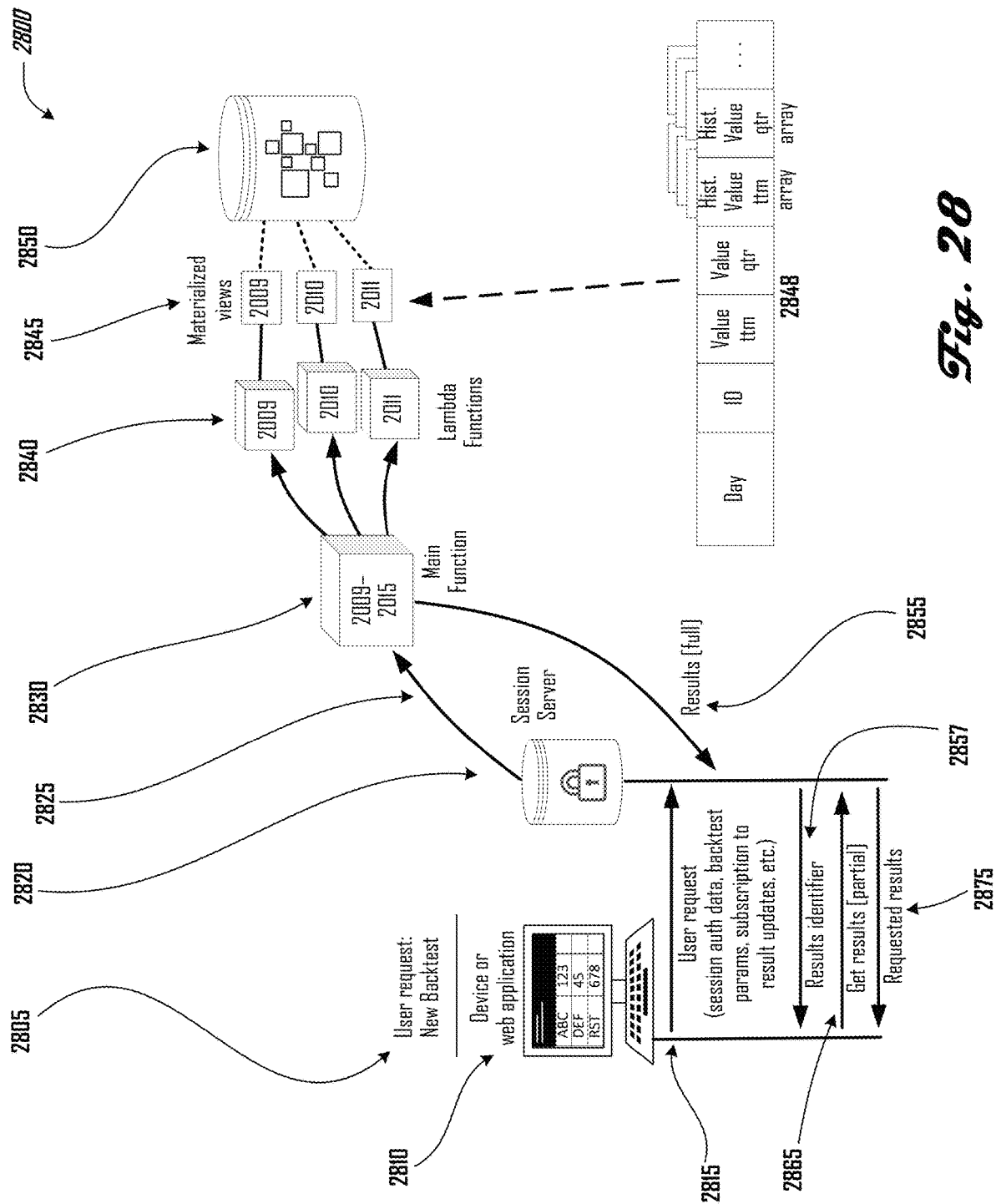
FIG. 28 is a schematic and data flow diagram illustrating several components of an example concurrent server interaction for backtesting in accordance with one embodiment.

FIG. 28 is a schematic and data flow diagram 2800 illustrating several components of an example concurrent server interaction for backtesting in accordance with one embodiment. A user interacts with a rapid screening system, such as via a web application or other client device 2810 (e.g., running local software or accessing software-as-a- service (SaaS)). The user requests a backtest 2805, e.g., as detailed above with reference to FIG. 17. The rapid screening system may operate similarly for less complex results such as modifying screening criteria and other portfolio analyses. The client web application or device 2810 sends a request 2815 to a session server 2820, e.g., a host device managing a user database on a remote server. The request 2815 may contain, e.g., subscriber authentication or session information to ensure that the subscriber is authorized (and, e.g., charged for the backtesting service) and/or dates and codes that specify the parameters of the backtest such as the criteria to test and the benchmark to test against. In various embodiments, the parameters are already associated with a user's session and available on the server, so identification of the current session and the backtesting request can be accomplished with minimal data transmission. In some embodiments, the client interface device or web application 2810 sends the session server 2820 one or more triggers for when new screens, backtests, or other portfolio analytics requests occur, and subscribes for updates to be received when the analysis is completed.

When the user has been verified by the session server 2820, the session server 2820 sends the request 2825 to a main function 2830, e.g., operating on a server such as one or more cloud computing instances. The main function 2830 manages the processing and assembly of the backtesting request as a whole, including executing the request using concurrent computing resources (e.g., triggering lambda functions 2840) to efficiently parallelize the backtesting calculations. Lambdas are simple, but accomplish a lot because the system can spawn many in parallel to concurrently perform large tasks in a short amount of time. For example, in backtests, the rapid screening system can break down calculations into discrete time periods such as each year in the backtest, and individual months in each year. This allows significant improvements in backtesting speed. In various embodiments, the domain-specific language is designed for concurrency and data sharding (e.g., across time, data items, and user-specific patterns).

In the illustrated embodiment, the lambda functions 2840 obtain data from one or more financial data database(s) 2850, with materialized views 2845 to contain snapshots across data and time. In some embodiments, the materialized view 2845 snapshots include a recent set of historical values as well, causing some repetition, but making it possible to access a custom trend for past years extremely quickly and in a comparable way, for example. The materialized view example data 2848 includes a date, an identifier, a pair of values (for the trailing twelve months, and for the current quarter), and a pair of sets of historical values (for the trailing twelve months, and for the current quarter). In various embodiments, the materialized views 2848 are saved to speed access when the same or another backtest is run; this allows a user to switch back and forth between results of different backtests without requiring recalculation. In various embodiments, the screening and/or backtest functions can plug into many types of datastores, and are not limited to databases 2850; for example, application programming interfaces (APIs) may also be used effectively.

The lambda functions 2840 return to the main function 2830, and the main function 2830 delivers the full results 2855 of the backtest or other analysis to the session server 2820. In various embodiments, after a query is run, the full results 2855 are stored server-side. This means that the rapid screening system does not need to re-run the query all the time if the data itself is not going to change (e.g., sorting, grouping, etc.), and also opens up the possibility for incremental querying.

In some embodiments, the lambda functions 2840 update with results for which the client interface device or web application 2810 has subscribed. In some embodiments, the session server 2820 provides a results identifier 2857 to the client interface device or web application 2810. The client interface device or web application 2810 may then request partial results 2865 (e.g., only what is necessary to render results visible on the user's display). The session server 2820 then delivers the requested portion of the results 2875 to the client interface device or web application 2810.

FIG. 29 is a schematic diagram 2900 illustrating several components of an example server system for implementing a rapid screening system in accordance with one embodiment. A user interacts with a rapid screening system, such as via a web application or other client device 2910. The web application 2910 is in communication with a session server 2920 via, e.g., server endpoints 2905, 2908 for requests such as screening, backtesting, or performing time-series forecast analytics. Requests to server endpoint 2905 are handled by the server on a 1:1 correspondence basis, in which the session server 2920 inserts, for example, one row per request into a session database. For example, when processing a screening session of a user who enters an expression, the web application 2910 provides the entered expression to the session server 2920, which can initiate a process for the expression. For example, any time a row gets updated, added, or removed in the editor, the web application 2910 notifies the session server 2920, which initiates a request to the backend database 2940 or compiler/interpreter 2930. In some embodiments, a backtest request from the web application 2910 to the session server 2920 is also handled on a 1:1 basis.

Requests to server endpoint 2908 are handled by the server on a 1:many correspondence basis, in which the session server 2920 inserts, for example, multiple rows per request into a session database. For example, in response to a time-series analytics request, the session server 2920 can initiate a separate process for each combination of a company and a forecast (i.e., each cell in the results table) rather than one process for the entire request. In some embodiments, the web application 2910 client initiates a series of separate requests; in some embodiments, the session server 2920 receives an analytics request and spawns the required subtasks. In either case, the separate tasks can produce a set of results on a per-cell basis rather than, e.g., a single JSON blob, allowing the results to be assembled asynchronously.

Other components of the session server 2920 include authentication services 2921 to ensure that requesters are authorized and that data is secure; the authentication services 2921 may be linked with user data 2922. A user database 2922 can additionally store a user's code (e.g., ensuring that screening expressions are automatically saved and available across sessions), preferences, and/or authentication credentials, and may provide a caching layer. A session data service 2923 manages a user's session data including caching screening results 2934. For example, for a user who is running a screen, when the user writes code in the domain-specific language, the session data service 2923 can insert a row for the code in a session database. In some embodiments, the session data service polls for updates. When the requested data is loaded (e.g., from the compiler/interpreter 2930), the session data service 2923 caches the data and updates the web application 2910 with the results.

In addition, the session server 2920 can store context data 2924. The context data 2924 may include, for example, custom universes (each including, e.g., the name of the universe, parameters that define the universe (e.g., minimum market capitalization, countries, specific company names, etc.)) and/or custom indexes (each including, e.g., the name of the index, and a time series of returns (that the user can upload)). Context data 2924 can be shared between users to allow easier collaboration and minimize duplication or sync issues.

In the illustrated embodiment, the session server 2920 is separate from the compiler/interpreter 2930. Separately storing session data can provide advantages. For example, it can allow data to be more easily auditable, for user analytics and/or telemetry. In addition, it can allow reporting on what data is used most, by what people—not just what package, but also granular data such as field mapping-which can help reduce costs. The structure of the disclosed technology thus allows introspection and analysis that is generally not possible to do when running conventional backend database queries.

In addition, because the compiler/interpreter 2930 is a separate server and because the domain-specific language provides context on what a user is trying to accomplish and the expected results are verifiable and replicable, the disclosed system enables a system administrator to make language feature updates without the traditional constraints of a programming language. This enables new features to be delivered to users faster because the structure of the domain-specific language and the contextual understanding of it can allow the administrator to ensure that they never break (as is typical with new versions of conventional languages).

The compiler/interpreter 2930 is the workhorse responsible for performing the actual requests for screening searches, backtests, and/or analytics modeling. The schematic is a simplified logical representation; a person having skill in the art will understand that the compiler/interpreter 2930 can comprise, as an example, distributed computing resources to perform the required data processing, load balancing/queue management, etc. The illustrated separation of the session server 2920 from the compiler/interpreter 2930 is also advantageous for the compiler/interpreter 2930, which does not need to understand users, but does need to understand data sources.

In the illustrated embodiment, a screening model 2935 contains or references a grammar 2931, which it uses to parse the user's code (e.g., as a whole) into an abstract syntax tree (AST) 2932. The screening model 2935 evaluates each line 2933, including the expressions in each line (e.g., in order). For each line, it interprets the AST. The screening model 2935 connects to one or more databases (including caches if available) to obtain data, and for each line continuously builds up a result set 2934. The screening model 2935 inserts the result set 2934 into the session data service 2923 results database.

In the illustrated embodiment, a backtesting model 2936 runs through backtest-specific logic 2937 as well as sharing screening model 2935 components. The backtesting model 2936 leverages the screening model 2935 as well as various database optimizations (including snapshotting, as well as offloading some calculations to be closer to the data store). When a backtest is run, it is often rebalanced over time according to a set of buy/sell criteria. These criteria can be expressed as screening criteria. Therefore, if a user composes a screen, then with no additional configuration, they can immediately run a backtest based on that screening code, with as little as one click.

The compiler/interpreter 2930 then leverages its semantic understanding of the user's intent (that they want to run a backtest) to optimize the code before executing it as part of rebalancing steps in the backtesting model 2936. For instance, if a data tag or expression is determined to be unused within the context of a backtest-perhaps a leftover column from an exploratory screening session, or calculated for display purposes to the end user only-then the backtesting model 2936 can strip or otherwise exclude that code before executing the backtest, as it will not meaningfully impact the filtering criteria or factor weights for the backtest. In contrast, a backtest that is run using a generalized programming language lacks this semantic understanding (that some the data that was pulled down or that some of the analytics performed have no meaningful impact in the current action the user is to perform), so this kind of optimization cannot be performed automatically using conventional means.

In various embodiments (e.g., for running a backtest across multiple years), the backtesting model 2936 breaks down the backtest into sub-components and parallelizes them 2938 (e.g., by month, or to calculate returns, etc.).

Additional models 2939 (e.g., a time series analytics processing model) are similarly executed by the compiler/interpreter 2930 and produce sets of results that are sent to the session server 2920. With minimal context required, the same domain-specific language is applicable to all of the models provided by the compiler/interpreter 2930.

In some embodiments, to promote caching, a request can be run through the compiler/interpreter 2930 twice: a first time to collect and prefetch data tags, and a second time to actually evaluate the request. This can enable a datastore to effectively cache results at the first runthrough.

Backend data can include both non-optimized data stores 2945 and optimized databases 2940. For example, commonly accessed data can be optimized for speedy retrieval, especially with respect to the most common queries. Optimized database 2940 components can include, for example, lightweight read-access tables 2941 for different datasets, and point-in-time snapshots 2942 (e.g., for "today" and "end of month" going back a certain number of years) to reduce query time. Unstructured data (e.g., 10-K filings) can be processed to become more optimized. Optimization is not binary, however; for example, patent information includes large amounts of unstructured text, but filings can also be processed to link them to companies, such as via name similarity (not just linking to static data). Thus, such databases do not have to have exact matches to security names or identifiers, and they can nevertheless be "joined" in other ways.

Optimization is not merely a tool to provide improved performance, but an advantage provided by the structure of the disclosed systems. Conventionally, the person running a query on the data set (e.g., running a backtest request) has no control over the underlying database, which is a large data store that must satisfy queries from users with different aims and handle generalized programming languages accessing the database. The disclosed technology, by contrast, imposes significant constraints on use cases and access patterns while remaining highly expressive, which is what allows optimizations that produce performant results and more user-friendly interfaces.

In some embodiments, data stores and other elements of the system are fully extensible and open to integrations. For example, remote access is possible to any database with API adherence, and any provider can implement an interface. The data itself is specific to the domain that the language is specific to, but the data server "just works" if it adheres to the specified interface. Similarly, extensibility can apply to: sets of data tags (in a standardized format, whether defined in a domain-specific language, custom, derived, or even self-referential); additional transformations; custom reporting templates (e.g., results of backtests or screening); results (e.g., returned in a standardized JSON format); views (e.g., to display an array of strings as a bulleted HTML list); and even models (e.g., providing a separate session database endpoint for each model). Views, for example, can be passed back to the web application 2910 as HTML or in a data structure, which allows data to be rendered specially based on its content or context. Thus, URLs can be displayed as links, arrays of values can be treated as graphs, and values for variables whose name ends in "Score" or "Ranking" can be displayed with a heatmap color gradient, for example.

Essentially, any data tag, any function, any model, and any report can be integrated into the disclosed fully extensible system. While basic operators for domain-specific languages may stay the same, new data types, treatments, and transformations can be customized for different domains or clients.

Although specific embodiments have been illustrated and described herein, it will be appreciated by those of ordinary skill in the art that alternate and/or equivalent implementations may be substituted for the specific embodiments shown and described without departing from the scope of the present disclosure.

For example, although various embodiments are described above in terms of a rapid screening system and/or service provided by one or more servers to a remote client, in other embodiments, screening methods similar to those described herein may be employed locally on a client computer to find and display results within a local or remote corpus.

Similarly, although various embodiments are described above in terms of a screening system or service that enables screening of stocks or other securities (e.g., debt instruments, cryptocurrency, etc.), other embodiments may use similar techniques to allow screening or winnowing of data in another specialized domain of knowledge such as real estate, advertising, healthcare diagnostics, drug research, hiring, fantasy sports, movies, scientific data, photographs, or the like. As a few examples, backtesting could run simulations of different drugs in a set of given conditions; a screening system applied to a domain of geological data could improve searching for oil drilling sites; a system applied to real estate could locate undervalued house purchasing opportunities; and a system applied to screening for cancer could provide improved ability to immediately perform complex analytics in samples and identify trends and promising avenues for investigation. In other embodiments, various other applications may be made of the disclosed technology. This application is intended to cover any adaptations or variations of the embodiments discussed herein.

What is claimed is:

1. A system to process natural language input into domain-specific screening criteria for screening a set of identifiers, each identifier representing a member of the domain, each member having multiple attributes, the system comprising a processor and a memory configured for:
providing a natural language input interface;
receiving, via the natural language input interface, natural language input;
processing, by a model, the natural language input;
wherein the model is trained to process a natural language statement into domain-specific symbols, the domain-specific symbols including:
a plurality of domain-specific data tags, each data tag associated with one or more time-linked attribute values for each of a plurality of the identifiers of the set, and
a plurality of operations that can be applied to data tag-associated time-linked attribute values;
such that the processing of the natural language input by the model generates a first domain-specific screening criterion that includes:
a first data tag of the plurality of domain-specific data tags, and
a first operation of the plurality of operations;
providing a criteria interface;
entering, in the criteria interface, the first domain-specific screening criterion generated by the processing;
executing the first domain-specific screening criterion, wherein the executing includes:
determining, out of the plurality of the identifiers, a first subset of identifiers for which the first domain-specific screening criterion is executed;
loading time-linked attribute values associated with the first data tag from a data source; and
applying the first operation to the loaded time-linked attribute values to produce result values for a second subset of identifiers that is included in the first subset, wherein each result value is associated with an identifier in the second subset of identifiers; and
providing an output display interface;
presenting, in the output display interface, the result values for the second subset of identifiers, wherein the presenting includes, for each identifier of the second subset of identifiers, an associated value of the result values in the output display interface,
such that the output display interface corresponds to contents of the criteria interface including at least the first domain-specific screening criterion.

2. The system of claim 1, wherein the model is a language model or language processing model.

3. The system of claim 2, wherein the model is a generative pre-trained transformer or a large language model (LLM) of at least a billion parameters.

4. The system of claim 1, wherein the processing of the natural language input by the model includes recognizing, in the natural language input, at least a portion of the natural language input corresponding more closely to the first data tag than to another data tag of the plurality of domain-specific data tags.

5. The system of claim 1, wherein in response to an input error, the model generates a domain-specific completion suggestion or error correction, and the natural language input interface or the criteria interface displays the domain-specific completion suggestion or error correction; or wherein in response to the input error, the model generates a domain-specific completion suggestion or error correction that is based on a determined textual or semantic similarity of the input error to a domain-specific data tag.

6. The system of claim 1, wherein a data tag is associated with a series of time-linked attribute values over time, and for each of a plurality of the identifiers of the set, the presented result values include an array of the time-linked attribute values, a timeseries, a trend, or a graph of the series of time-linked attribute values.

7. The system of claim 1, wherein the processing of the natural language input by the model generates multiple domain-specific screening criteria from a single natural language statement.

8. The system of claim 1, wherein (a) the model processes the natural language input as it is received, on a continual basis, without waiting for a user to stop; or (b) the model processes the received natural language input after the user pauses for at least a determined debounce period, enters an indication of completion, or makes a selection among a plurality of options; or
wherein executing the first domain-specific screening criterion and presenting the result values in the output display interface includes executing contents of the criteria interface including the first domain-specific screening criterion (c) as they are entered in the criteria interface, on a continual basis; or (d) after the user pauses for at least a determined debounce period, makes a selection among a plurality of options, or enters an indication of completion.

9. The system of claim 1, wherein entering the first domain-specific screening criterion in the criteria interface includes presenting one or more of an icon, a button, a selection or dropdown menu, a statement, an expression, or a formula representing the first domain-specific screening criterion.

10. The system of claim 1, wherein the criteria interface includes a link or control to change an order of the first domain-specific screening criterion relative to a second domain-specific screening criterion.

11. The system of claim 1, wherein a data tag is associated with data tag explanatory text and wherein entering, in the criteria interface, the first domain-specific screening criterion generated by the processing includes the data tag explanatory text for the first data tag or a link or control to display the data tag explanatory text for the first data tag.

12. The system of claim 1, wherein an operation is associated with operation explanatory text and wherein entering, in the criteria interface, the first domain-specific screening criterion generated by the processing includes the operation explanatory text for the first operation or a link or control to display the operation explanatory text for the first operation.

13. The system of claim 1, wherein the criteria interface includes a link or control to edit the domain-specific screening criterion or to display an editing interface that allows a user to edit the first domain-specific screening criterion.

14. The system of claim 13, wherein the link or control or the editing interface includes a single-line editor, a multi-line editor, a dropdown menu, a contextual menu item, a button, a drag-and-drop interface, or the natural language input interface.

15. The system of claim 13, wherein the natural language input interface, the criteria interface, or the editing interface displays the natural language input as text.

16. The system of claim 15, further comprising allowing the first domain-specific screening criterion entered in the criteria interface to be hidden as an intermediate calculation, step, or layer between the natural language input and the output display interface.

17. The system of claim 1, wherein the system is configured for receiving (a) user input selecting the set of identifiers, and the determining chooses the selected set of identifiers as the first subset of identifiers for which the first domain-specific screening criterion is executed, or (b) a zeroth domain-specific screening criterion that precedes the first domain-specific screening criterion, and the determining chooses a subset of identifiers resulting from the zeroth domain-specific screening criterion as the first subset of identifiers for which the first domain-specific screening criterion is executed; or
wherein the first domain-specific screening criterion includes a data tag that references output from the zeroth domain-specific screening criterion, such that the result values for the second subset of identifiers are based on the output from the zeroth domain-specific screening criterion.

18. The system of claim 1, further configured for receiving user input selecting one or more predefined or custom collections of identifiers from one or more data sources as the set of identifiers.

19. The system of claim 1, further comprising:
automatically identifying a data source associated with the first data tag, without requiring a user to explicitly specify a data source; or
identifying multiple data sources for time-linked attribute values to be loaded from; or
presenting (i) data provenance or attribution information or (ii) a hyperlink to a data source or source record.

20. The system of claim 1, wherein the first domain-specific screening criterion includes a statement, an expression, or a formula, and the executing further comprises:
parsing the first domain-specific screening criterion statement, expression, or formula with respect to the plurality of domain-specific data tags and the plurality of operations,
wherein the parsing includes recognizing, in the first domain-specific screening criterion statement, expression, or formula, the first data tag and the first operation.

21. The system of claim 1, further comprising assigning the result values for the second subset of identifiers to a new automatically named or user-named data tag, wherein the system recognizes the new automatically named or user-named data tag as one of the plurality of domain-specific data tags in the domain-specific symbols and a second domain-specific screening criterion can refer to the new automatically named or user-named data tag.

22. The system of claim 1, wherein the first operation produces a result value for each identifier in the first subset, such that the second subset contains the same identifiers as the first subset.

23. The system of claim 22, wherein the first operation is a transformation that produces result values that comprise metadata characterizing data tag-associated time-linked attribute values, and wherein the transformation is one of averaging by mean or median, ranking, grouping, bucketing into quintiles or deciles, standardizing, or indicating a trend or trend stability, or sentiment.

24. The system of claim 1, wherein the first operation filters the first subset of identifiers for which the first domain-specific screening criterion is executed, such that the second subset of identifiers is a proper subset of the first subset that contains fewer identifiers than the first subset; and wherein the output display interface before the presenting includes identifiers in the first subset that are not in the second subset, and the output display interface after the presenting includes only identifiers that are in the second subset.

25. The system of claim 24, wherein the first operation includes one or more of matching, comparison, contains or includes, mentions, top, highest, low, lowest, increasing, decreasing, or an enumeration.

26. The system of claim 1, further comprising, as a user modifies the contents of the criteria interface, changing the presenting of the result values.

27. The system of claim 1, wherein either:
the output display interface is presented on a page together with the natural language input interface or the criteria interface, or
the output display interface is presented on a page separate from the natural language input interface or the criteria interface, such that the natural language input interface or the criteria interface is hidden when the output display interface is presented.

28. The system of claim 1, wherein:
the first domain-specific screening criterion entered in the criteria interface or a data tag contained in the first domain-specific screening criterion corresponds to a cell, column, row, table, cluster, window, or other visual collection of information presented in the output display interface; and
the presenting in the output display interface comprises inserting the cell, column, row, table, cluster, window, or other visual collection for the result values in the output display interface.

29. The system of claim 1, further configured for backtesting criteria entered in the criteria interface, including the first domain-specific screening criterion, by applying the criteria to a period of historical data of the set of identifiers, wherein the backtesting includes:
determining, out of the set of identifiers, according to the criteria entered in the criteria interface, including the first domain-specific screening criterion, a backtesting subset of identifiers;
loading historical values over the period of historical data associated with data tags of the criteria entered in the criteria interface, including the first data tag, from the data source; and
applying operations of the criteria entered in the criteria interface, including the first operation, to the loaded historical values over the period of historical data to produce backtesting result values over the period of historical data for the backtesting subset of identifiers; and
presenting, in the output display interface, an indication of how the backtesting subset of identifiers, determined according to the criteria entered in the criteria interface including the first domain-specific screening criterion, would have performed over the period of historical data.

30. A method comprising training the model of the system of claim 1 to generate, from the natural language statement, the domain-specific symbols making up the first domain-specific screening criterion.

* * * * *